(12) United States Patent
Diener et al.

(10) Patent No.: US 12,437,877 B2
(45) Date of Patent: Oct. 7, 2025

(54) WEIGHT LOSS POTENTIAL PREDICTION FROM GUT MICROBIOME DATA

(71) Applicant: Institute for Systems Biology, Seattle, WA (US)

(72) Inventors: Christian Diener, Seattle, WA (US); Sean M. Gibbons, Seatle, WA (US)

(73) Assignee: Institute of Systems Biology, Seattle, WA (US)

( * ) Notice: Subject to any disclaimer, the term of this patent is extended or adjusted under 35 U.S.C. 154(b) by 8 days.

(21) Appl. No.: 18/149,498

(22) Filed: Jan. 3, 2023

(65) Prior Publication Data

US 2023/0215581 A1 Jul. 6, 2023

Related U.S. Application Data

(60) Provisional application No. 63/296,423, filed on Jan. 4, 2022.

(51) Int. Cl.
*G16H 50/30* (2018.01)
*G16H 20/60* (2018.01)

(52) U.S. Cl.
CPC .............. *G16H 50/30* (2018.01); *G16H 20/60* (2018.01)

(58) Field of Classification Search
CPC ........ G16H 10/20; G16H 10/40; G16H 10/60; G16H 10/65; G16H 15/00; G16H 20/10; G16H 20/13; G16H 20/17; G16H 20/30; G16H 20/40; G16H 20/60; G16H 20/70; G16H 20/90; G16H 30/20; G16H 30/40; G16H 40/20; G16H 40/40; G16H 40/60; G16H 40/63; G16H 40/67; G16H 50/20; G16H 50/30; G16H 50/50; G16H 50/70; G16H 50/80; G16H 70/20; G16H 70/40; G16H 70/60; G16H 80/00
See application file for complete search history.

(56) References Cited

U.S. PATENT DOCUMENTS

2022/0220540 A1* 7/2022 Harris ................... C12Q 1/689

OTHER PUBLICATIONS

Lavrenkova, Dina Anatolievna. "The Role of Gut Microbiota on Obesity Development." Universidade de Coimbra (Portugal), MAI 83/12(E), Masters Abstracts International, 2013, pp. 69-71; (Year: 2013).*

(Continued)

*Primary Examiner* — Chad A Newton
(74) *Attorney, Agent, or Firm* — Mughal Gaudry & Franklin PC

(57) ABSTRACT

Predicting a weight loss potential from gut microbiome data is described herein. In an example, a system accesses gut microbiome metagenomic sequence data for a subject and determines a measurement of one or more weight loss features from the gut microbiome metagenomic sequence data. The one or more weight loss features define a gut microbiome signature for weight loss response for the subject independent of a body mass index of the subject. The system determines a weight loss potential for the subject based on a comparison of the measurement of the subject to a plurality of reference measurements of the one or more weight loss features for a reference population showing variable weight loss responses. The system outputs the weight loss potential for the subject.

20 Claims, 8 Drawing Sheets
Specification includes a Sequence Listing.

(56) References Cited

OTHER PUBLICATIONS

Liu, Yan, et al. "Gut Microbiome Fermentation Determines the Efficacy of Exercise for Diabetes Prevention." Cell Metabolism, vol. 31, No. 1, Jan. 2020, pp. 77-91.e5, www.cell.com/cell-metabolism/fulltext/S1550-4131(19)30608-4, https://doi.org/10.1016/j.cmet.2019.11.001 (Year: 2020).*

American College of Cardiology/American Heart Association Task Force on Practice Guidelines, Obesity Expert Panel, "Executive summary: guidelines (2013) for the management of overweight and obesity in adults: a report of the American College of Cardiology/American Heart Association Task Force on Practice Guidelines and the Obesity Society published by the Obesity Society and American College of Cardiology/American Heart Association Task Force on Practice Guidelines." Based on a systematic review from the The Obesity Expert Panel, 2013. Obesity 22 (Suppl 2).

Appel LJ et al., "A clinical trial of the effects of dietary patterns on blood pressure." N Engl J Med 336:1117-1124. https://doi.org/10.1056/NEJM199704173361601, 1997.

Aronson D et al., "Obesity is the major determinant of elevated C-reactive protein in subjects with the metabolic syndrome." Int J Obes 28:674-679. https://doi.org/10.1038/sj.ijo.0802609, 2004.

Berry SE et al., "Human postprandial responses to food and potential for precision nutrition." Nat Med 26:964-973. https://doi.org/10.1038/s41591-020-0934-0, 2020.

Brown CT et al., "Measurement of bacterial replication rates in microbial communities." Nat Biotechnol 34:1256-1263. https://doi.org/10.1038/nbt.3704, 2016.

Calgaro M et al., "Assessment of statistical methods from single cell, bulk RNA-seq, and metagenomics applied to microbiome data." Genome Biol 21:191. https://doi.org/10.1186/s13059-020-02104-1, 2020.

Carmody RN et al., "Cooking shapes the structure and function of the gut microbiome." Nat Microbiol 4:2052-2063. https://doi.org/10.1038/s41564-019-0569-4, 2019.

Chen S et al., "fastp: an ultra-fast all-in-one FastQ preprocessor." Bioinformatics 34:1884-1890. https://doi.org/10.1093/bioinformatics/bty560, 2018.

Christensen L, "Prevotella abundance predicts weight loss success in healthy, overweight adults consuming a whole-grain diet ad libitum: a post hoc analysis of a 6-wk randomized controlled trial." J Nutr 149:2174-2181. https://doi.org/10.1093/jn/nxz198, 2019.

Cirulli ET et al., "Profound perturbation of the metabolome in obesity is associated with health risk." Cell Metab 29:488-500.e2. https://doi.org/10.1016/j.cmet.2018.09.022, 2019.

Diener C et al., "MICOM: metagenomescale modeling to infer metabolic interactions in the gut microbiota." mSystems 5:e00606-19. https://doi.org/10.1128/mSystems.00606-19, 2020.

Duvallet C et al., "Meta-analysis of gut microbiome studies identifies disease-specific and shared responses." Nat Commun 8:1784. https://doi.org/10.1038/s41467-017-01973-8, 2017.

Engström G et al., "Inflammation-sensitive plasma proteins are associated with future weight gain." Diabetes 52:2097-2101. https://doi.org/10.2337/diabetes.52.8.2097, 2003.

George BJ et al., "Common scientific and statistical errors in obesity research. Obesity (Silver Spring)" 24:781-790. https://doi.org/10.1002/oby.21449, 2016.

Gutierrez DA et al., "Hematopoietic Kit deficiency, rather than lack of mast cells, protects mice from obesity and insulin resistance." Cell Metab 21:678-691. https://doi.org/10.1016/j.cmet.2015.04.013, 2015.

Haskell WL et al., "Physical activity and public health: updated recommendation for adults from the American College of Sports Medicine and the American Heart Association." Med Sci Sports Exerc 39:1423-1434. https://doi.org/10.1249/mss.0b013e3180616b27, 2007.

Heymsfield SB et al., "Recombinant leptin for weight loss in obese and lean adults: a randomized, controlled, dose-escalation trial." JAMA 282:1568-1575. https://doi.org/10.1001/jama.282.16.1568, 1999.

Hjorth MF et al., "Pretreatment Prevotella-to-Bacteroides ratio and salivary amylase gene copy number as prognostic markers for dietary weight loss." Am J Clin Nutr 111:1079-1086. https://doi.org/10.1093/ajcn/nqaa007, 2020.

Huang Z et al., "The stem cell factor/Kit signalling pathway regulates mitochondrial function and energy expenditure." Nat Commun 5:4282. https://doi.org/10.1038/ncomms5282, 2014.

Hyatt D et al., "Prodigal: prokaryotic gene recognition and translation initiation site identification." BMC Bioinformatics 11:119. https://doi.org/10.1186/1471-2105-11-119, 2010.

Jiao N et al., "Gut microbiome may contribute to insulin resistance and systemic inflammation in obese rodents: a meta-analysis." Physiol Genomics 50:244-254. https://doi.org/10.1152/physiolgenomics.00114.2017, 2018.

Jie Z et al., "The baseline gut microbiota directs dieting-induced weight loss trajectories." Gastroenterology 160:2029-2042.e16. https://doi.org/10.1053/j.gastro.2021.01.029, 2021.

Knowler WC et al., "Reduction in the incidence of type 2 diabetes with lifestyle intervention or metformin." N Engl J Med 346:393-403. https://doi.org/10.1056/NEJMoa012512, 2002.

Korem T et al., "Growth dynamics of gut microbiota in health and disease inferred from single metagenomic samples." Science 349:1101-1106. https://doi.org/10.1126/science.aac4812, 2015.

Le Chatelier E et al., "Richness of human gut microbiome correlates with metabolic markers." Nature 500:541-546. https://doi.org/10.1038/nature12506, 2013.

Li H. "Minimap2: pairwise alignment for nucleotide sequences." Bioinformatics 34:3094-3100. https://doi.org/10.1093/bioinformatics/bty191, 2018.

Long J-R et al., "APOE and TGF-1 genes are associated with obesity phenotypes." J Med Genet 40:918-924. https://doi.org/10.1136/jmg.40.12.918, 2003.

Love MI et al., "Moderated estimation of fold change and dispersion for RNA-seq data with DESeq2." Genome Biol 15:550. https://doi.org/10.1186/s13059-014-0550-8, 2014.

Lu J et al., "Bracken: estimating species abundance in metagenomics data." PeerJ Comput Sci 3:e104. https://doi.org/10.7717/peerj-cs.104, 2017.

Lu J et al., "Ultrafast and accurate 16S rRNA microbial community analysis using Kraken 2." Microbiome 8:124. https://doi.org/10.1186/s40168-020-00900-2, 2020.

MacLean B et al., "Skyline: an open source document editor for creating and analyzing targeted proteomics experiments." Bioinformatics 26:966-968. https://doi.org/10.1093/bioinformatics/btq054, 2010.

Manor O et al., "A multi-omic association study of trimethylamine N-oxide." Cell Rep 24:935-946. https://doi.org/10.1016/j.celrep.2018.06.096, 2018.

Maruvada P et al., "The human microbiome and obesity: moving beyond associations." Cell Host Microbe 22:589-599. https://doi.org/10.1016/j.chom.2017.10.005, 2017.

McMurdie PJ et al., "phyloseq: an R package for reproducible interactive analysis and graphics of microbiome census data." PLoS One 8: e61217. https://doi.org/10.1371/journal.pone.0061217,2 013.

Mocanu V et al., "Fecal microbial transplantation and fiber supplementation in patients with severe obesity and metabolic syndrome: a randomized double-blind, placebo-controlled phase 2 trial." NatMed 27:1272-1279. https://doi.org/10.1038/s41591-021-01399-2, 2021.

Morris MC et al., "Mind diet slows cognitive decline with aging." Alzheimers Dement 11:1015-1022. https://doi.org/10.1016/j.jalz.2015.04.011, 2015.

Nielsen RL et al., "Data integration for prediction of weight loss in randomized controlled dietary trials." Sci Rep 10:20103. https://doi.org/10.1038/s41598-020-76097-z, 2020.

Nigro E et al., "New insight into adiponectin role in obesity and obesity-related diseases." Biomed Res Int 2014:658913. https://doi.org/10.1155/2014/658913, 2014.

Pardina E et al., "The relationships between IGF-1 and CRP, NO, leptin, and adiponectin during weight loss in the morbidly obese." Obes Surg 20:623-632. https://doi.org/10.1007/s11695-010-0103-5, 2010.

(56) References Cited

OTHER PUBLICATIONS

Patro R et al., "Salmon provides fast and bias-aware quantification of transcript expression." Nat Methods 14:417-419. https://doi.org/10.1038/nmeth.4197, 2017.

Péan N et al., "Dominant gut Prevotella copri in gastrectomised nonobese diabetic Goto-Kakizaki rats improves glucose homeostasis through enhanced FXR signalling." Diabetologia 63:1223-1235. https://doi.org/10.1007/s00125-020-05122-7,2020.

Price ND et al., "A wellness study of 108 individuals using personal, dense, dynamic data clouds." Nat Biotechnol 35:747-756. https://doi.org/10.1038/nbt.3870, 2017.

Qin S et al., "Identification of organ-enriched protein biomarkers of acute liver injury by targeted quantitative proteomics of blood in acetaminophen- and carbon-tetrachloridetreated mouse models and acetaminophen overdose patients." J Proteome Res 15:3724-3740. https://doi.org/10.1021/acs.jproteome.6b00547, 2016.

Ridaura VK et al., "Gut microbiota from twins discordant for obesity modulate metabolism in mice." Science 341:1241214. https://doi.org/10.1126/science.1241214,2013.

Ritchie ME et al., "limmapowers differential expression analyses for RNA-sequencing and microarray studies." Nucleic Acids Res 43:e47. https://doi.org/10.1093/nar/gkv007, 2015.

Saltiel AR et al., "Inflammatory mechanisms linking obesity and metabolic disease." J Clin Invest 127:1-4. https://doi.org/10.1172/JCI92035, 2017.

Sze MA et al., "Looking for a signal in the noise: revisiting obesity and the microbiome.", mBio 7:e01018-16. https://doi.org/10.1128/mBio.01018-16, 2016.

Thiele I et al., "Personalized whole-body models integrate metabolism, physiology, and the gut microbiome." Mol Syst Biol 16:e8982. https://doi.org/10.15252/msb.20198982, 2020.

Turnbaugh PJ et al., "An obesity-associated gut microbiome with increased capacity for energy harvest." Nature 444:1027-1031. https://doi.org/10.1038/nature05414, 2006.

Turnbaugh PJ et al., "A core gut microbiome in obese and lean twins." Nature 457:480-484. https://doi.org/10.1038/nature07540, 2009.

Valsesia A et al, "Integrative phenotyping of glycemic responders upon clinical weight loss using multi-omics." Sci Rep 10:9236. https://doi.org/10.1038/s41598-020-65936-8,2020.

Von Meijenfeldt FAB et al., "Robust taxonomic classification of uncharted microbial sequences and bins with CAT and BAT." Genome Biol 20:217. https://doi.org/10.1186/s13059-019-1817-x, 2019.

Vujkovic-Cvijin I et al., "Host variables confound gut microbiota studies of human disease." Nature 587:448-454. https://doi.org/10.1038/s41586-020-2881-9, 2020.

Whelton PK et al., "ACC/AHA/AAPA/ABC/ACPM/AGS/APhA/ASH/ASPC/NMA/PCNA guideline for the prevention, detection, evaluation, and management of high blood pressure in adults: a report of the American College of Cardiology/American Heart Association Task Force on Clinical Practice Guidelines." American College of Cardiology, Washington, DC, 2018.

Wilmanski T et al., "Blood metabolome predicts gut microbiome a-diversity in humans." Nat Biotechnol 37:1217-1228. https://doi.org/10.1038/s41587-019-0233-9, 2019.

Wilmanski T et al., "Gut microbiome pattern reflects healthy ageing and predicts survival in humans." Nat Metab 3:274-286. https://doi.org/10.1038/s42255-021-00348-0, 2021.

Yu EW et al., "Fecal microbiota transplantation for the improvement of metabolism in obesity: the FMT-TRIM doubleblind placebo-controlled pilot trial." PLoS Med 17:e1003051. https://doi.org/10.1371/journal.pmed.1003051, 2020.

Zeevi D et al., "Personalized nutrition by prediction of glycemic responses." Cell 163: 1079-1094. https://doi.org/10.1016/j.cell.2015.11.001, 2015.

Zhou Y et al., "Measurement of organ-specific and acute-phase blood protein levels in early Lyme disease." J Proteome Res 19:346-359. https://doi.org/10.1021/acs.jproteome.9b00569, 2020.

Zubair N et al., "Genetic predisposition impacts clinical changes in a lifestyle coaching program." Sci Rep 9:6805. https://doi.org/10.1038/s41598-019-43058-0, 2019.

\* cited by examiner

WEIGHT LOSS POTENTIAL PREDICTION FROM GUT MICROBIOME DATA

CROSS-REFERENCE TO RELATED APPLICATIONS

This application claims the benefit of and the priority to U.S. Provisional Application No. 63/296,423, filed on Jan. 4, 2022, which is hereby incorporated by reference b all purposes.

SEQUENCE LISTING

The instant application contains a Sequence Listing which has been submitted electronically in XML file format and is hereby incorporated by reference in its entirety. Said XML copy, created on Jul. 15, 2025, is named 57ISB12US_SL.xml and is 27,724 bytes in size.

FIELD

Embodiments relate to generating a predicted weight loss potential using gut microbiome data. The gut microbiome data may include gut microbiome metagenomic sequence data of a subject.

BACKGROUND

Body mass index (BMI) is a measure of body fat of an individual and is commonly used categorize individuals as underweight, normal weight, overweight, or obese. BMI is also often used as an indicator of an individual's ability to lose weight with lifestyle changes such as increased physical activity and dietary changes. For instance, a higher BMI may be thought to indicate a higher ability of an individual to lose weight than a lower BMI. However, there are many confounding variables with regard to obesity phenotypes, including genetics, prior health status, age, physical activity, and diet, which can modulate whether or not an individual who is nominally overweight or obese is able to lose weight. Recent studies have begun to explore whether or not gut microbiome contributes directly to changes in weight after an intervention, independent of BMI. The gut microbiome has been shown to contribute to weight gain, indicating that similar factors may contribute to weight loss.

Therefore, it may be advantageous to monitor and process pertinent indicators of the gut microbiome to predict a weight loss potential of a subject, so as to facilitate treatment that may result in better outcomes for the subject.

SUMMARY

Embodiments of the present disclosure relate to a computer-implemented method that involves accessing gut microbiome metagenomic sequence data for a subject and determining a measurement of one or more weight loss features in the gut microbiome metagenomic sequence data. The one or more weight loss features can define a gut microbiome signature for weight loss response for the subject independent of a body mass index of the subject. The computer-implemented method also involves determining a weight loss potential for the subject based on a comparison of the measurement of the subject to a plurality of reference measurements of the one or more weight loss features for a reference population showing variable weight loss responses and outputting the weight loss potential for the subject.

In some embodiments, the reference population comprises a first group associated with weight loss and a second group unassociated with weight loss. The first group corresponds to a first subset of subjects of the reference population having a loss of body weight over a weight loss intervention period, and the second group corresponds to a second subset of subjects of the reference population that maintain a stable weight over the weight loss intervention period.

In some embodiments, the performing the comparison can involve mapping the subject to a first group of the reference population associated with weight loss during a weight loss intervention period or to a second group of the reference population unassociated with weight loss during the weight loss intervention period.

In some embodiments, the one or more weight loss features comprise a plurality of gut bacterial replication rates for the subject and a gut bacterial gene abundance for a gut metabolism of the subject, a gut inflammation of the subject, or a combination thereof.

In some embodiments, the one or more weight loss features comprise: (i) a plurality of gut bacterial replication rates for strictly anaerobic gram-negative gut bacteria of the subject and (ii) a gut bacterial gene abundance for a gut metabolism of the subject, a gut inflammation of the subject, or a combination thereof. The gut metabolism corresponds to an abundance of gut glycosyl hydrolase genes for the subject and the gut inflammation corresponds to an abundance of respiration-related genes and an abundance of stress-response genes for the subject.

In some embodiments, (i) the weight loss potential being above a first threshold is associated with an abundance of gut glycosyl hydrolase genes for the subject being below a second threshold, an abundance of respiration-related genes and an abundance of stress-response genes for the subject being below a third threshold, and replication rates of strictly anaerobic gram-negative gut bacteria of the subject being above a fourth threshold, and (ii) the weight loss potential being below the first threshold is associated with the abundance of the gut glycosyl hydrolase genes for the subject being above the second threshold, the abundance of the respiration-related genes and the abundance of the stress-response genes for the subject being above the third threshold, and the replication rates of strictly anaerobic gram-negative gut bacteria for the subject being below the fourth threshold.

In some embodiments, the weight loss potential characterizes whether or a degree to which the subject is predicted to lose weight with a lifestyle modification comprising one or more of diabetes prevention, exercise, or dietary intervention.

In some embodiments, the computer-implemented method further involves facilitating a treatment for the subject based on the weight loss potential.

In some embodiments, the computer-implemented method further involves determining a lifestyle modification for the subject is associated with the weight loss potential for the subject being above a threshold and facilitating a treatment including the lifestyle modification for the subject.

In some embodiments, the computer-implemented method further involves determining a lifestyle modification for the subject is associated with the weight loss potential for the subject being below a threshold and facilitating a treatment including a weight loss intervention comprising one or more of a pharmacologic intervention, a probiotic supplement, or a prebiotic fiber supplement for the subject.

In some embodiments, a system is provided that includes one or more data processors and a non-transitory computer readable storage medium containing instructions which, when executed on the one or more data processors, cause the one or more data processors to perform a set of actions including accessing gut microbiome metagenomic sequence data for a subject and determining a measurement of one or more weight loss features in the gut microbiome metagenomic sequence data. The one or more weight loss features can define a gut microbiome signature for weight loss response for the subject independent of a body mass index of the subject. The set of actions also includes determining a weight loss potential for the subject based on a comparison of the measurement of the subject to a plurality of reference measurements of the one or more weight loss features for a reference population showing variable weight loss responses and outputting the weight loss potential for the subject.

In some embodiments, a computer-program product is provided that is tangibly embodied in a non-transitory machine-readable storage medium and that includes instructions configured to cause one or more data processors to perform a set of actions including accessing gut microbiome metagenomic sequence data for a subject and determining a measurement of one or more weight loss features in the gut microbiome metagenomic sequence data. The one or more weight loss features can define a gut microbiome signature for weight loss response for the subject independent of a body mass index of the subject. The set of actions also includes determining a weight loss potential for the subject based on a comparison of the measurement of the subject to a plurality of reference measurements of the one or more weight loss features for a reference population showing variable weight loss responses and outputting the weight loss potential for the subject.

BRIEF DESCRIPTION OF THE DRAWINGS

The present disclosure is described in conjunction with the appended figures.

Figure 1:
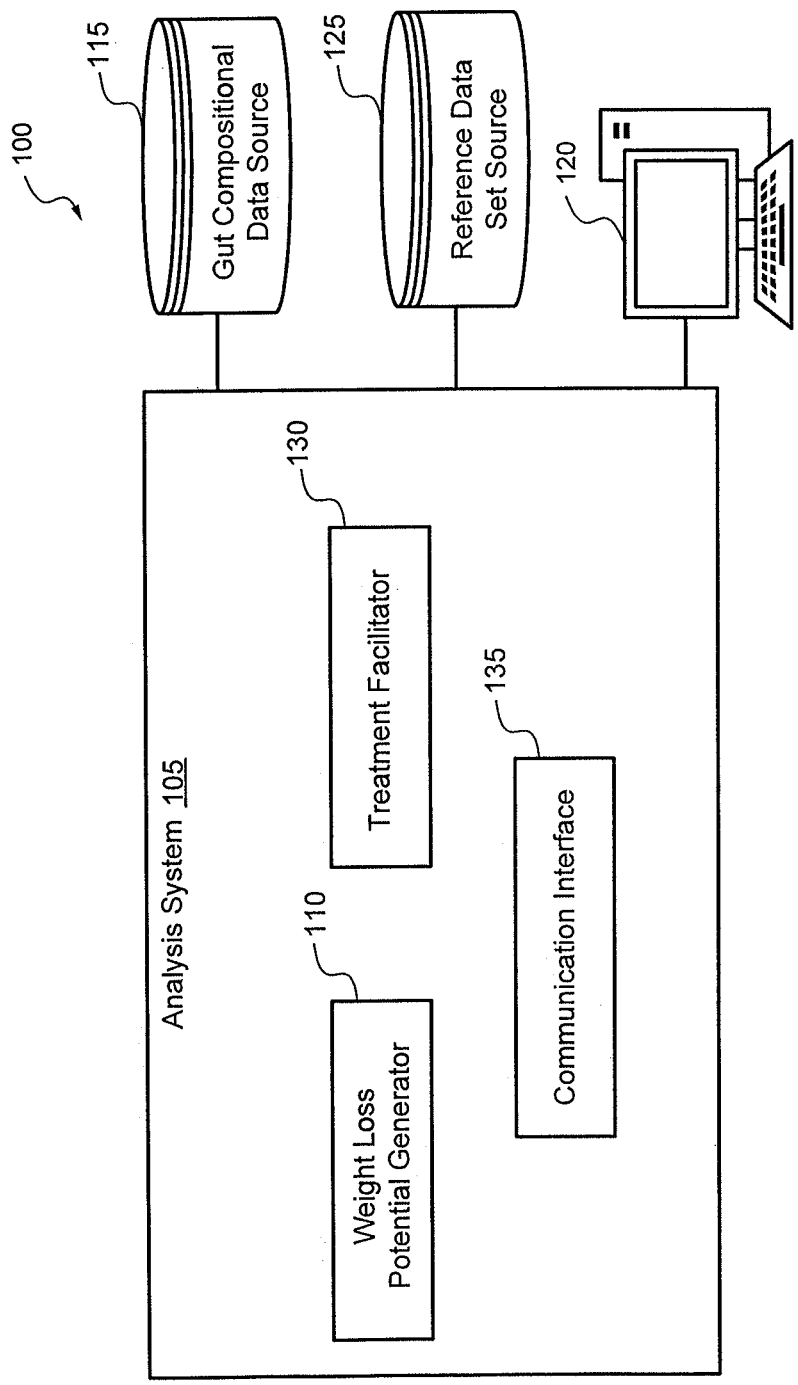
FIG. 1 shows an exemplary computing system for predicting a weight loss potential from gut microbiome data according to some aspects of the present disclosure.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Overview

Typically, treatment decisions for weight loss are made through trial-and-error between a clinician and a subject based on a body mass index (BMI) of the subject. Avoiding this trial-and-error phase through individualized analysis of genetic, physiological, and health parameters can improve treatment efficacy by recommending a treatment in accordance with a subject's determined likelihood to lose weight given particular lifestyle changes.

A combination of baseline multi-omics features (e.g., metagenomic features, blood metabolomic features, etc.) and microbiome data can predict postprandial glycemic responses to various foods. Thus, taxonomic composition of gut microbiota of a subject may influence host responses to interventions. The associations between the gut microbiome and weight loss phenotypes may be independent of associations between BMI and the gut microbiome. This suggests that gut microbiome data for a subject may be indicative of the subject's weight loss response given a particular weight loss intervention or lifestyle modification independent of BMI.

Some embodiments relate to using gut microbiome metagenomic sequence data of a subject to determine a weight loss potential for the subject, which may further be used to determine a recommended treatment for the subject. The gut compositional data represents microbiome information about the gut of the subject. Measurements related to gut bacterial replication rates and gut bacterial gene abundance for one or more of gut metabolism or gut inflammation can be derived from the gut microbiome metagenomic sequence data. The measurements can then be compared to reference measurements for a reference population with demonstrated variable weight loss responses to determine the weight loss potential. A recommended treatment of a change to an exercise routine, a diabetes prevention, a dietary intervention, a pharmacological intervention, a probiotic supplement, and/or a prebiotic fiber supplement may then be determined for the subject based on the weight loss potential.

Facilitating the recommended therapy may involve generating a recommendation for providing the treatment to the subject. The recommendation can indicate an intensity (e.g., an amount of exercise or a dosage of a pharmacological intervention, a probiotic supplement, or a prebiotic supplement) for the treatment or a range of intensities for the treatment based on the predicted weight loss potential. The recommendation may additionally include supporting information that is indicative as to why the recommendation is provided. In some instances, particular gut compositional data (e.g., a high abundance of gut glycosyl hydrolases) may be associated with a lower weight loss potential. As a result, the recommended treatment may involve recommending a probiotic supplement for the subject. Conversely, other gut compositional data may be associated with a higher weight loss potential, so the recommended treatment may involve a recommendation of a lifestyle modification (e.g., a low-calorie and reduced-fat diet) may be more likely to occur for the subject.

The efficacy of a weight loss intervention or a lifestyle modification may be directly impacted by the gut microbiome. As an example, a subject with higher a *Prevotella*-to-*Bacteroides* ratio or a low salivary amylase level may lose significantly more weight on a high-fiber diet than on other diets. So, determining a recommended treatment for a subject based on gut microbiome metagenomic data may provide improved treatment compared to the typical approaches of using BMI and trial-and-error.

Systems and Methods for Weight Loss Potential Prediction

FIG. 1 shows an exemplary computing system 100 for facilitating weight loss potential prediction based on gut microbiome data. The computing system 100 can include an analysis system 105 to execute a weight loss potential generator 110 for determining a gut microbiome signature for weight loss response. The weight loss potential generator 110 may be used to (for example) predict a weight loss potential from which a recommended treatment for a subject can be determined.

The weight loss potential generator 110 may access an input data set that includes gut microbiome metagenomic sequence data for a subject. In some instances, the analysis system 105 may generate the gut microbiome metagenomic sequence data by accessing blood metabolite data, blood proteomic data, clinical lab data, and/or fecal 16S rRNA gene sequencing data for the subject. The analysis system 105, or another system (e.g., provider system 120 associated with a laboratory or clinician) can perform 16S RNA amplicon or shotgun metagenomic sequencing on a stool sample of the subject to determine the fecal 16S rRNA gene sequence data. Additionally or alternatively, the analysis system 105 may determine blood markers for gut microbiome composition in blood metabolite data for the subject.

The weight loss potential generator 110 can determine a measurement of one or more weight loss features from the gut microbiome metagenomic sequence data. The weight loss features can define a gut microbiome signature for weight loss response for the subject. The weight loss features may not include the BMI of the subject, such that the gut microbiome signature for weight loss response is independent of BMI. Examples of the weight loss features can include gut bacterial replication rates for the subject, gut bacterial gene abundance for the subject, and complex polysaccharide and protein degradation genes. The gut bacterial gene abundance may be for a gut metabolism of the subject and/or a gut inflammation of the subject. In some particular examples, the gut bacterial replication rates may be for strictly anaerobic gram-negative gut bacteria, the gut metabolism may correspond to an abundance of gut bacterial glycosyl hydrolase genes, and/or the gut inflammation may correspond to an abundance of gut bacterial respiration-related and stress-response genes. Examples of strictly anaerobic gram-negative gut bacteria are the Bacteroidetes and Verrucomicrobia phyla, where increased replication rates for Bacteroidetes and Verrucomicrobia are positively associated with weight loss potential.

To determine the measurement of the weight loss features, the weight loss potential generator 110 can identify organ-specific proteins with genetic variants associated with obesity or metabolic syndrome in the gut microbiome metagenomic sequence data for the subject. For instance, the weight loss potential generator 110 may identify the ACTN3 gene and its associated peptide sequence, the ADIPOQ gene and its associated peptide sequences, the AGT gene and its associated peptide sequences, etc. In addition, the weight loss potential generator 110 can identify amplicon sequence variants (ASVs) of the gut microbiome metagenomic sequence data. Forward and reverse ASVs can be merged, and chimeras can be removed. The weight loss potential generator 110 can then map remaining reads to taxonomic genera and taxonomic species. From this, the weight loss potential generator 110 can determine genus abundances, metagenomic species abundances, and gene abundances for the subject.

The weight loss potential generator 110 can measure the gut metabolism for the subject by determining the abundance of gut bacterial genes associated with one or more of amino acid metabolism, nitrogen metabolism, carbohydrate metabolism, or phospholipid metabolism for the subject from the gut microbiome metagenomic sequence data. In an example, the carbohydrate metabolism may be glycan metabolism measured by determining an abundance of bacterial glycosyl hydrolases for the subject. An increased abundance of gut glycosyl hydrolases may be negatively associated with weight loss potential.

The weight loss potential generator 110 can measure the gut inflammation by determining an abundance of gut bacterial genes associated with one or more of respiration and stress-response of the subject from the gut microbiome metagenomic sequence data. The respiration and stress-response may correspond to an abundance of gut bacterial genes associated with one or more of respiratory metabolism, redox homeostasis, and oxygen stress pathways in the gut for the subject. An increased respiration and stress-response in the gut may be negatively associated with weight loss potential.

In some instances, the weight loss potential generator 110 can determine the gut bacterial replication rates representing bacterial growth from the gut microbiome metagenomic sequence data. The bacterial growth can correspond to the abundance of gut bacterial genes associated with one or more of cell wall synthesis or lipopolysaccharide synthesis for the subject.

The weight loss potential generator 110 can measure gene abundances for gene clusters involving pathways associated with gut metabolism, bacterial growth, and the like. For example, the gut metabolism can be measured by determining an abundance of metagenomic gene clusters that are involved with one or more of amino acid metabolism, nitrogen metabolism, carbohydrate metabolism, or phospholipid metabolism. Gut inflammation can be measured by determining metagenomic gene abundance of respiration-related and stress-response genes. Similarly, gut bacterial growth can measured by determining the replication rate estimated from metagenomes of strictly anaerobic gram-negative gut bacteria alone or together with gut bacterial gene cluster abundance associated with one or more of cell wall synthesis and lipopolysaccharide synthesis. Examples of such gut bacterial gene clusters include, but are not limited to, those associated with the KEGG KO terms, which are shown in Table 4 below. For instance, the gene clusters may include polysaccharide degradation genes selected from KEGG KO term K00689, protein degradation genes selected from KO term K01658, stress-response genes selected from KO term K06959, respiration-related genes selected from KO term K00342, lipopolysaccharide synthesis genes selected from KO term K03606, and/or cell wall synthesis genes selected from KO term K11528.

Upon determining the measurement of the weight loss features, the weight loss potential generator 110 can determine a weight loss potential for the subject. The weight loss potential may be a prediction that characterizes whether or a degree to which the subject is expected to lose weight with a lifestyle modification. Examples of the lifestyle modification include a diabetes prevention, a change to an exercise routine, and/or a dietary intervention.

To determine the weight loss potential, the weight loss potential generator 110 can compare the measurement of the subject to reference measurements of the weight loss features for a reference population. The weight loss potential generator 110 can receive the reference measurements of the reference population from a reference data set source 125. Alternatively, the reference data set source 125 may store blood metabolomic data, blood proteomic data, clinical lab data, dietary questionnaire data, stool 16S rRNA gene sequencing data, and follow-up data on weight change for the reference population. The weight loss potential generator 110 may access some or all of this data and derive the reference measurements from the data.

In an example, the reference population includes subjects showing variable weight loss responses to lifestyle modifications. The reference population may include (for example) a first group of subjects that are associated with a measured loss of body weight (e.g., a loss more than 1% of body weight per month) over a weight loss intervention period and a second group of subjects that are associated with maintaining a sufficiently stable weight (e.g., gained or lost less than 0.1% of their body weight) over the weight loss intervention period. As such, the first group may be considered a "weight loss" group and the second group may be considered a "no weight loss" group.

The weight loss potential generator 110 can map the subject into the first group or the second group by comparing the measurement of the subject to the reference measurements. The comparison may be direct, where differences between the replication rates and gene abundances are directly compared for the subject and the reference population. Alternatively, the comparison may be indirect, where differences between the measurement and the reference measurements are qualified by indirect reference to thresholds, intervals, or ranges to determine whether the subject is to be classified in the first group or the second group. For example, if the difference between the measurement for the subject and an average reference measurement for the subset of subjects in the first group is within a particular range, the subject may be classified into the first group. In some embodiments, comparing the subject measurement to the reference measurements can involve determining differences between, or relative to, the measurement of the subject and the reference measurements of the reference population, and mapping the subject to the "weight loss" group or to the "no weight loss" group.

In some instances, a higher weight loss potential may be associated with a lower abundance of the gut glycosyl hydrolase genes, a lower abundance of the respiration-related and stress-response genes, and/or higher replication rates of strictly anaerobic gram-negative gut bacteria. In addition, a lower weight loss potential may be associated with a higher abundance of the gut glycosyl hydrolase genes, a higher abundance of the respiration-related and stress-response genes, and/or a lower replication rate of strictly anaerobic gram-negative gut bacteria. The weight loss potential generator 110 may determine, based on the comparison between the measurements of the subject and the reference measurements of the reference population, that the subject includes an abundance of gut glycosyl hydrolase genes below a first threshold, an abundance of respiration-related and stress-response genes below a second threshold, and/or replication rates of strictly anaerobic gram-negative gut bacteria above a third threshold. Accordingly, the weight loss potential generator 110 can determine the weight loss potential for the subject to be above a fourth threshold, where the weight loss potential above the threshold is associated with a high weight loss potential. The high weight loss potential can indicate that the subject is more likely to lose weight with a lifestyle change compared to subjects associated with a low weight loss potential.

Alternatively, the weight loss potential generator 110 may determine, based on the comparison between the measurements of the subject and the reference measurements of the reference population, that the subject includes an abundance of gut glycosyl hydrolase genes above the first threshold, an abundance of respiration-related and stress-response genes above the second threshold, and replication rates of strictly anaerobic gram-negative gut bacteria below the third threshold. Accordingly, the weight loss potential generator 110 can determine the weight loss potential for the subject to be below the fourth threshold, where the weight loss potential below the threshold is associated with a low weight loss potential. Other combinations of differences between the measurements may additionally result in determinations of the weight loss potential being above and below the fourth threshold.

Upon determining the weight loss potential for the subject, the weight loss potential generator 110 may additionally determine a recommended treatment for the subject in accordance with the weight loss potential. The recommended treatment may differ between subjects predicted to have a high weight loss potential and subjects predicted to have a low weight loss potential. For instance, the recommended treatment for a subject associated with a high weight loss potential based on the comparison between the measurement and the reference measurements may be one or more lifestyle modifications. Examples of the lifestyle modifications can include a diabetes prevention, a change to an exercise routine, and a dietary intervention. The diabetes prevention and the change to the exercise routine may be an increase in physical activity of the subject (e.g., to at least 150 minutes of physical activity per week). In addition, the diabetes prevention and the dietary change may include eating less fat and fewer calories. In some examples, the diabetes prevention may involve taking a medication, such as metformin.

The recommended treatment for a subject associated with a low weight loss potential based on the comparison between the measurement and the reference measurements may be a weight loss intervention. Examples of the weight loss intervention can include administering a pharmacologic intervention (e.g., an anti-inflammatory composition for reducing intestinal inflammation or alpha-glucosidase inhibitors for limiting complex carbohydrate metabolism), a probiotic supplement, and/or prebiotic fiber supplement, so as to push a weight-loss resistant microbiome to look more like a weight-loss permissive microbiome.

A treatment facilitator 130 of the analysis system 105 can then facilitate a treatment for the subject based on the weight loss potential and in accordance with the recommended treatment. Facilitating the treatment may involve outputting a recommendation for providing a treatment (e.g., a lifestyle modification or a weight loss intervention) according to the weight loss potential to the subject. The recommendation can indicate an intensity (e.g., an amount of exercise or a dosage of a pharmacological intervention, a probiotic supplement, or a prebiotic supplement) or a range of intensities for the treatment. The recommendation may additionally include information that is indicative as to why the recommendation is provided. For instance, the information may indicate which measurement of the gut microbiome metagenomic sequence data contributed to the recommendation.

A communication interface 135 can collect results and communicate the result(s) (or a processed version thereof) to the provider system 120 (e.g., associated with care provider of the subject), or another system. For example, communication interface 135 may generate and output an indication of the weight loss potential for the subject. The communication interface may also generate and output an indication of the recommended treatment for the subject. The weight loss potential and/or the recommendation may then be presented and/or transmitted, which may facilitate a display of the weight loss potential and/or the recommended treatment, for example on a display of a computing device.

Figure 2:
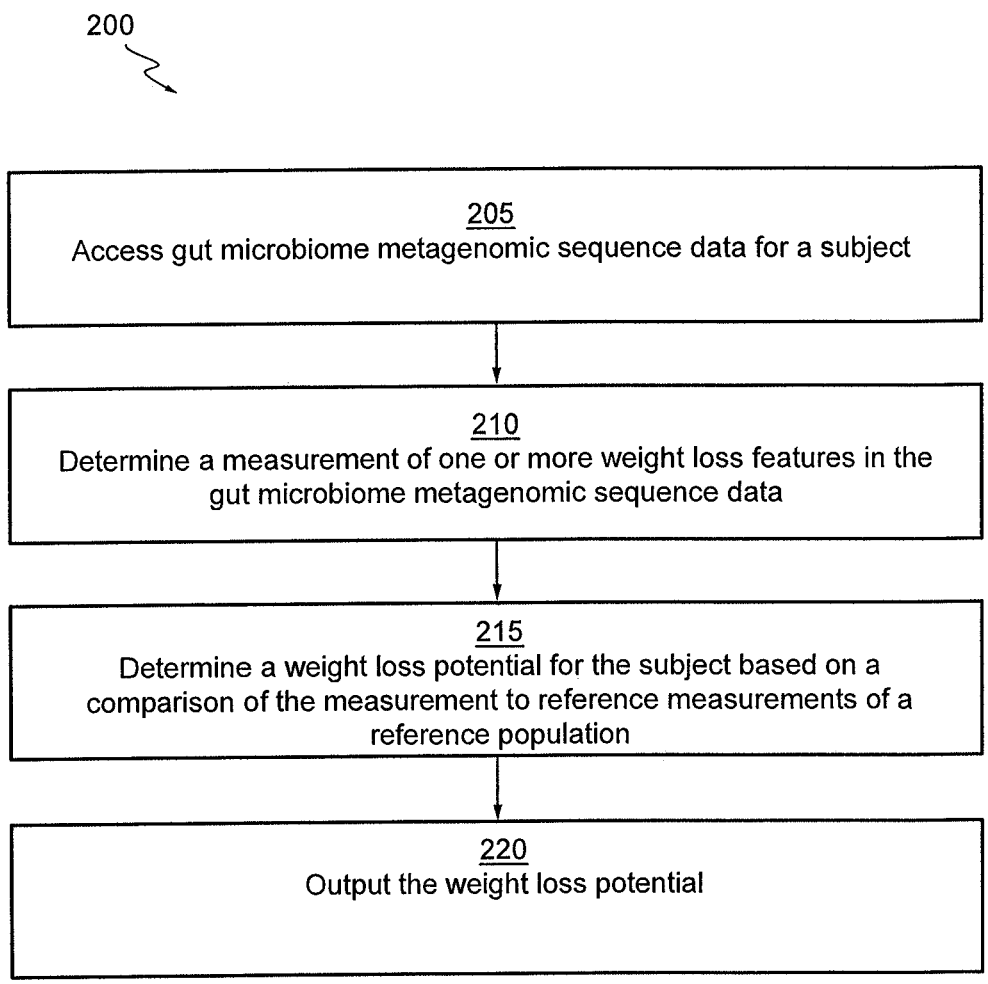
FIG. 2 illustrates an exemplary process of determining a weight loss potential from gut microbiome data according to some aspects of the present disclosure.

FIG. 2 illustrates an exemplary process 200 of determining a weight loss potential from gut microbiome data according to some aspects of the present disclosure. At block 205, gut microbiome metagenomic sequence data for a subject is accessed. The gut microbiome metagenomic sequence data can be generated from fecal rRNA gene sequencing for the subject.

At block 210, a measurement of the one or more weight loss features in the gut microbiome metagenomic sequence data are determined. The one or more weight loss features can define a gut microbiome signature for weight loss response for the subject independent of the BMI of the subject. The one or more weight loss features can include gut bacterial replication rates for the subject and a gut bacterial gene abundance for: (i) a gut metabolism of the subject, (ii) a gut inflammation of the subject, or (iii) a combination thereof. The gut bacterial replication rates may be for strictly anaerobic gram-negative gut bacteria. The gut metabolism for the subject can be determined by measuring the abundance of gut bacterial genes associated with one or more of amino acid metabolism, nitrogen metabolism, carbohydrate metabolism, or phospholipid metabolism for the subject from the gut microbiome metagenomic sequence data. In an example, the gut metabolism can correspond to an abundance of gut glycosyl hydrolase genes for the subject. The gut inflammation can be determined by measuring an abundance of gut bacterial genes associated with one or more of respiration and stress-response of the subject from the gut microbiome metagenomic sequence data.

At block 215, a weight loss potential for the subject is determined based on a comparison of the measurement to reference measurements of a reference population. The reference measurements correspond to measurements of the one or more weight loss features for subjects in the reference population. The reference population may include subsets of subjects that are associated with variable weight loss responses over a weight loss intervention period. For instance, a first group may be associated with a loss of body weight over the weight loss intervention period and a second group may be associated with maintaining a stable weight over the weight loss intervention period. The weight loss potential can characterize whether or a degree to which the subject is predicted to lose weight with a lifestyle modification involving one or more of a diabetes prevention, a change to an exercise routine, or a dietary intervention. A prediction of the weight loss potential may be generated by inputting the measurement of the weight loss features into a model (e.g., a machine-learning model) that outputs the prediction.

In an example, the subject may be mapped into the first group or the second group by an indirect or a direct comparison. For a direct comparison, the replication rates and gene abundances can be directly compared for the subject and the reference population. The subject can then be mapped to a group based on a determined difference between the reference measurements and the reference measurements (e.g., a mean reference measurement, median reference measurement, etc.) for each of the first group and the second group. So, if the difference is smaller for the first group than the second group, the subject can be mapped into the first group. For an indirect comparison, the differences between the measurement and the reference measurements can be compared to thresholds, intervals, or ranges to determine whether the subject is to be classified in the first group or the second group.

A higher weight loss potential may be associated with a lower abundance of the gut glycosyl hydrolase genes, a lower abundance of the respiration-related and stress-response genes, and/or higher replication rates of strictly anaerobic gram-negative gut bacteria. In contrast, a lower weight loss potential may be associated with a higher abundance of the gut glycosyl hydrolase genes, a higher abundance of the respiration-related and stress-response genes, and/or a lower replication rate of strictly anaerobic gram-negative gut bacteria. So, based on determining that the measurements of the subject indicate an abundance of gut glycosyl hydrolase genes below a first threshold, an abundance of respiration-related and stress-response genes below a second threshold, and/or replication rates of strictly anaerobic gram-negative gut bacteria above a third threshold, the weight loss potential for the subject can be determined to be above a fourth threshold. Each of the thresholds may be determined based on the reference population, where measurements above a particular threshold is associated with either the first group or the second group and measurements below the particular threshold is associated with the other group. The weight loss potential or a prediction of the weight loss potential being above the fourth threshold may be associated with a high weight loss potential. The high weight loss potential can indicate that the subject is more likely to lose weight with a lifestyle change compared to subjects associated with a low weight loss potential.

In some instances, a recommended treatment for the subject is determined based on the weight loss potential. The recommended treatment can be selected from a lifestyle modification including a diabetes prevention, a change to an exercise routine, a dietary intervention, or a combination thereof, or a weight loss intervention including a pharmacologic intervention, a probiotic supplement, or a prebiotic fiber supplement. For instance, the recommended treatment may be lifestyle modification if the weight loss potential is a high weight loss potential and the recommended treatment may be a weight loss intervention if the weight loss potential is a low weight loss potential.

At block 220, the weight loss potential is output. The recommended treatment may additionally be output. The weight loss potential and/or the recommended treatment may be output to a computing device associated with a clinician of the subject such that the clinician can prescribe the recommended treatment for the subject. In addition, an intensity for the recommended treatment may be determined based on the weight loss potential. An indication of the intensity can be provided to a provider system so that the appropriate treatment can be provided to the subject.

FIG. 2 shows one exemplary process for predicting a recommended therapy from gut compositional data. Other examples can include more steps, fewer steps, different steps, or a different order of steps.

EXAMPLES

The following examples are provided to illustrate certain particular features and/or embodiments. These examples should not be construed to limit the disclosure to the particular features or embodiments described.

Data and Study Setting

A study was performed with subjects that were over 18 years of age, not pregnant, and a resident of any U.S. state except New York. The subjects analyzed in this study were the 92% of subjects who agreed to research use as of 19 Jun. 2018 and enrolled in the program between July 2015 and March 2018.

Figure 3:
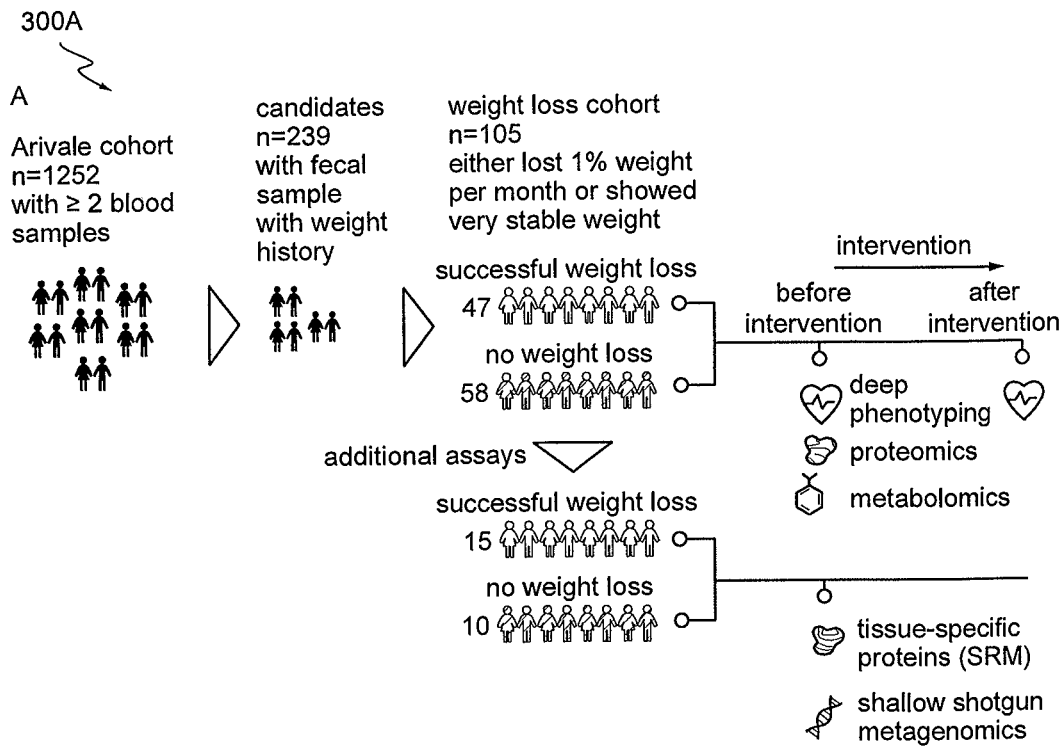
FIG. 3 illustrates an exemplary study design and reference-population information.
Figure 3:
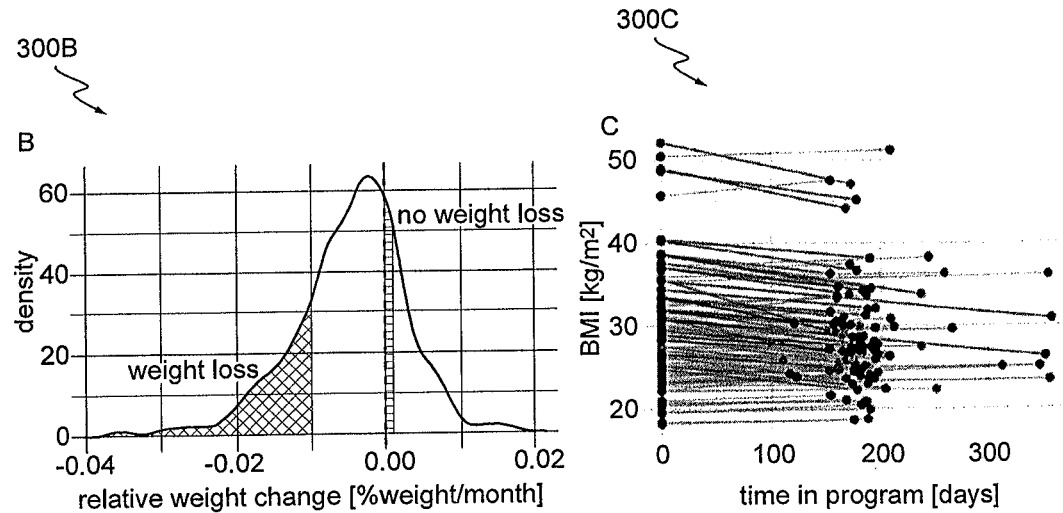

Of the approximately 5,000 subjects who agreed to research use of their data, 1,252 had blood draws at two time points (e.g., a baseline sample and then a follow-up sample at approximately 6 to 12 months) (as shown in diagram 300A in FIG. 3). Of the 1,252 subjects, 239 had follow-up BMI data within the year after the first blood draw and had biobanked serum and fecal samples available that were sampled within 30 days of each other (as illustrated in FIG. 3). Subjects with zero variance in weight measurements were removed. These instances result from digital scales when regular weighing was not performed and the prior weight was reported repeatedly. Relative weight change was calculated as the follow up weight 2 baseline weight divided by the months between measurements. The study subjects were then assembled by selecting all subjects who either lost more than 1% of body weight per month (n=48, "weight loss" group) or retained a stable body weight (e.g., gained less than 0.1% of their body weight, n=57, "no weight loss" group) during the lifestyle intervention (graph 300B in FIG. 3). A subcohort of 25 of these 105 subjects was selected for additional proteomic and metagenomic assays. Specifically, 15 subjects with the largest declines in weight were used as the "weight loss" group, whereas 10 subjects with the 20 smallest positive weight change values were chosen as the "no weight loss" group (and a 10-subject subset was selected to ensure a balanced representation of sexes across groups).

Referring to FIG. 3, study design and cohorts are shown. Diagram 300A is a schematic showing the number of subjects within a wellness intervention cohort who match the selection criteria for data completeness and "weight loss" and "no weight loss" groups. Subjects in the "weight loss" group lost >1% of body weight per month during the program whereas the "no weight loss" group maintained a stable weight, changing less than 0.1%. Graph 300B illustrates the distribution of relative weight change for the 239 candidate subjects, with the cross-hatched area on the left showing subjects who lost >1% of their body weight per month (n=48) and the patterned area on the right showing subjects who showed no change in weight (n=57) over the same intervention period. Graph 300C shows the baseline and follow-up BMI values. Points from the same subject are connected by lines patterned by weight loss group: darker lines denote "weight loss" and lighter lines denote "no weight loss" for the "weight loss" and "no weight loss" cohorts (n=105). Green dots in graph 300C denote subjects with additional proteomic and metagenomic data (n=25).

Subject Behavioral Intervention

Subjects who enrolled in a yearlong commercial behavioral coaching program were paired with a registered dietitian or registered nurse coach. Personalized, telephonic behavioral coaching was provided to each subject on a monthly basis, with email or text communications between coaching calls. Each subject's clinical and genetic data were available to them via a web dashboard and mobile app, which they could also use to communicate with their coach and schedule calls or blood draws. Coaches provided specific recommendations to address out-of-range clinical results based on clinical practice guidelines, published scientific evidence, or professional society guidelines. Examples of the evidence behind the coaching recommendations include guidelines from the American Heart Association or American Diabetes Association, comprehensive lifestyle interventions such as those developed for the Diabetes Prevention Program (DPP), nutrition recommendations such as those based on the dietary approach to stop hypertension (DASH) dietary pattern or the Mediterranean-DASH intervention for neurodegenerative delay (MIND) diet, and exercise recommendations from the American College of Sports Medicine.

Blood Collection and Multi-Omic Data Generation

Blood draws for all assays were performed by trained phlebotomists at LabCorp or Quest service centers and were scheduled every 6 months, but actual collection times varied. Metabolon conducted their Global Metabolomics high-performance liquid chromatography (HPLC)-mass spectrometry (MS) assays on subject plasma samples. Sample handling, quality control, and data extraction along with biochemical identification, data curation, quantification, and data normalizations were performed. For analysis, the raw metabolomics data were median scaled within each batch, such that the median value for each metabolite was 1. To adjust for possible batch effects, further normalization across batches was performed by dividing the median-scaled value of each metabolite by the corresponding average value for the same metabolite in quality control samples of the same batch. Missing values for metabolites were imputed to be the minimum observed value for that metabolite. Values for each metabolite were log transformed. Plasma protein levels were measured using three ProSeek proximity extension assay (PEA) panels (cardiovascular II, cardiovascular III, and inflammation arrays) from Olink Biosciences (Uppsala, Sweden), processed, and batch corrected as described previously. For analysis, a threshold of less than 5% missing values was set for each protein, which was passed by 263 different analytes. Missing values for the proteins were imputed to be the minimum observed value for that protein.

Dietary Food Frequency Questionnaires

Upon sign-up to the study, subjects filled out extensive questionnaires online. Consumption frequencies for a set of 39 different food entities were presented on an ordinal scale ranging from 0 (e.g., no consumption) up to 8 (e.g., very frequent consumption). The interpretation of consumption levels for each food group can be found in Table 1.

TABLE 1

Subject demographics stratified by statin use.

| Quantity | Scale |
| --- | --- |
| assessment_diet_freq_alcohol_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |

TABLE 1-continued

Subject demographics stratified by statin use.

| Quantity | Scale |
| --- | --- |
| assessment_diet_freq_breakfast_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_diet_freq_cruciferous_vegetables_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_diet_freq_snacking_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_diet_freq_fresh_fruit_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_diet_freq_raw_vegetables_salad_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_diet_freq_soft_drinks_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_diet_freq_water_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_diet_freq_beans_legumes_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_diet_freq_breakfast_cereal_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_diet_freq_caffeinated_beverages_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_diet_freq_cheese_int | (1) Less than once per month, (2) 1-3 times per month, (3) Once per week, (4) 2-4 times per week, (5) 5-6 times per week, (6) Once |

TABLE 1-continued

Subject demographics stratified by statin use.

| Quantity | Scale |
|---|---|
| | per day, (7) 2-3 times per day, (8) 4-5 times per day, (9) 6+ times per day |
| assessment_diet_freq_cook_home_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_diet_freq_cooked_green_vegetables_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_diet_freq_cooked_root_vegetables_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_diet_freq_eating_out_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_diet_freq_eggs_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_diet_freq_french_fries_int | (1) Less than once per month, (2) 1-3 times per month, (3) Once per week, (4) 2-4 times per week, (5) 5-6 times per week, (6) Once per day, (7) 2-3 times per day |
| assessment_diet_freq_fruit_juice_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_diet_freq_ice_cream_int | (1) Less than once per month, (2) 1-3 times per month, (3) Once per week, (4) 2-4 times per week, (5) 5-6 times per week, (6) Once per day, (7) 2-3 times per day, (8) 4-5 times per day |
| assessment_diet_freq_meat_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_diet_freq_nuts_seeds_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_diet_freq_oil_rich_fish_int | (1) Less than once per month, (2) 1-3 times per month, (3) Once per week, (4) 2-4 times per week, (5) 5-6 times per week, (6) Once |

TABLE 1-continued

Subject demographics stratified by statin use.

| Quantity | Scale |
|---|---|
| | per day, (7) 2-3 times per day, (8) 4-5 times per day, (9) 6+ times per day |
| assessment_diet_freq_pastries_int | (1) Less than once per month, (2) 1-3 times per month, (3) Once per week, (4) 2-4 times per week, (5) 5-6 times per week, (6) Once per day, (7) 2-3 times per day |
| assessment_diet_freq_plant_based_protein_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_diet_freq_potatoes_pasta_rice_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_diet_freq_poultry_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_diet_freq_processed_meat_int | (1) Less than once per month, (2) 1-3 times per month, (3) Once per week, (4) 2-4 times per week, (5) 5-6 times per week, (6) Once per day, (7) 2-3 times per day, (9) 6+ times per day |
| assessment_diet_freq_savory_snacks_int | (1) Less than once per month, (2) 1-3 times per month, (3) Once per week, (4) 2-4 times per week, (5) 5-6 times per week, (6) Once per day, (7) 2-3 times per day, (8) 4-5 times per day |
| assessment_diet_freq_sweets_chocolates_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_diet_freq_white_fish_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_diet_freq_yogurt_int | (1) Less than once per month, (2) 1-3 times per month, (3) Once per week, (4) 2-4 times per week, (5) 5-6 times per week, (6) Once per day, (7) 2-3 times per day, (8) 4-5 times per day, (9) 6+ times per day |
| assessment_lifestyle_cruciferous_vegetables_enum | (0) Daily, (1) 3-4 times per week, (2) Once per week, (3) Once per month, (4) Less than once per month |
| assessment_lifestyle_fruits_enum | (0) Zero/less than 1 per day, (1) 1, (2) 2-3, (3) 4-5, (4) 6 or more |
| assessment_lifestyle_vegetables_enum | (0) Zero/less than 1 per day, (1) 1, (2) 2-3, (3) 4-5, (4) 6 or more |
| assessment_lifestyle_sugary_drinks_enum | (0) Zero/less than 1 per day, (1) 1, (2) 2-3, (3) 4-5, (4) 6 or more |
| assessment_lifestyle_water_enum | (0) I don't usually drink water, (1) Less than 3 cups per day, (2) |

TABLE 1-continued

Subject demographics stratified by statin use.

| Quantity | Scale |
|---|---|
| | 4-5 cups per day, (3) 6-8 cups per day, (4) More than 8 cups per day |
| assessment_lifestyle_alcohol_drinks_a_day_enum | (0) I do not drink, (1) 1-2 drinks, (2) 3-4 drinks, (3) 5-6 drinks, (4) More than 6 drinks |
| assessment_lifestyle_grains_enum | (0) Zero/less than 1 per day, (1) 1-2, (2) 3-4, (3) 5-6, (4) 7 or more |

Stool Collection and Metagenomic Data Generation

At-home stool collection kits (DNA Genotek; OMR-200) were shipped directly to subjects and then shipped back to DNA Genotek for processing. Microbial DNA was isolated from 200 ml of homogenized fecal material using the DNeasy PowerSoil Pro extraction kit with bead beating in Qiagen Powerbead Pro plates (catalog no. 19311). Extracted DNA was quantified using the Quant-iT PicoGreen double-stranded DNA (dsDNA) assay kit, and all samples passed the quality threshold of 1 ng/ml (range, 8 to 101 ng/ml).

16S amplicon sequencing was performed. In brief, the 16S V3-V4 region was amplified and sequenced with 300-bp paired-end libraries on an Illumina MiSeq. Samples were demultiplexed using Illumina Basespace.

Shallow shotgun sequencing was performed. In brief, single-stranded 100-bp libraries were prepared using an optimized proprietary protocol of the provider based on the Nextera library prep kit and sequenced on a NovaSeq to a minimum of 2.6 million (2.6M) reads per sample (mean 3.5M, ranging from 2.6M to 4M). Demultiplexing was performed on Basespace.

Anthropometric Data

Height, weight, and waist circumference either were measured at the blood draws (45%) or were self-reported via an online assessment, or through the Fitbit Aria scale. Reference ranges for anthropometric data were defined by U.S. public health guidelines.

Selective Reaction Monitoring of Obesity-Related Proteins

Serum samples were processed following a previously published protocol that ensured maximum yield of signal. A curated selection of 22 mostly organ specific proteins with known genetic variants associated with obesity or metabolic syndrome were targeted (Table 2). Prepared samples, along with spiked-in heavy-isotope-labeled synthetic standard peptides, were quantified using a triple-quadrupole mass spectrometer (Agilent 6490) with a nanospray ion source and Chip Cube nano-HPLC. Three to four transitions were monitored for each target peptide (see Table 2). Two micrograms of tryptically-digested Mars-14 (Agilent, Santa Clara, CA) depleted serum was eluted from a high-capacity nano-HPLC chip (160 nl, 150 mm by 75 mm inside diameter [i.d.]) with a 30-min gradient of 3 to 40% acetonitrile. Raw selective reaction monitoring (SRM) mass spectrometry data were analyzed with the Skyline targeted proteomics environment. Each detected peptide was quantified by the light/heavy (L/H) ratio of monitored transitions, after adjusting for the volume of the original serum sample.

TABLE 2

SRM of obesity-related proteins

| Gene name | UniProtKB ID | Peptide sequence | Precursor Mz | organ |
|---|---|---|---|---|
| ACTN3 | Q08043 | AGTQIENIEEDFR (SEQ ID NO: 1) | 761.4 | skeletal muscle |
| ADIPOQ | Q15848 | GDIGETGVPGAEGPR (SEQ ID NO: 2) | 706.3 | adipose |
| ADIPOQ | Q15848 | IFYNQQNHYDGSTGK (SEQ ID NO: 3) | 591.3 | adipose |
| AGT | P01019 | DPTFIPAPIQAK (SEQ ID NO: 4) | 649.4 | liver |
| AGT | P01019 | LQAILGVPWK (SEQ ID NO: 5) | 562.8 | liver |
| APOA4 | P06727 | SELTQQLNALFQDK (SEQ ID NO: 6) | 817.9 | small intestine |
| APOA4 | P06727 | SLAELGGHLDQQVEEFR (SEQ ID NO: 7) | 643.3 | small intestine |
| APOB | P04114 | SVGFHLPSR (SEQ ID NO: 8) | 333.9 | liver |
| APOE | P02649 | AATVGSLAGQPLQER (SEQ ID NO: 9) | 499.9 | non-specific |

TABLE 2-continued

SRM of obesity-related proteins

| Gene name | UniProtKB ID | Peptide sequence | Precursor Mz | organ |
|---|---|---|---|---|
| APOE | P02649 | LGPLVEQGR (SEQ ID NO: 10) | 484.8 | non-specific |
| AHSG | P02765 | HTLNQIDEVK (SEQ ID NO: 11) | 399.5 | liver |
| CELA2B | P08218 | LQTNGALPDDLK (SEQ ID NO: 12) | 642.8 | pancreas |
| CRP | P02741 | GYSIFSYATK (SEQ ID NO: 13) | 568.8 | liver |
| C5 | P01031 | IDTQDIEASHYR (SEQ ID NO: 14) | 483.2 | liver |
| DBH | P09172 | AFYYPEEAGLAFGGPGSSR (SEQ ID NO: 15) | 659.3 | adrenal gland |
| DBH | P09172 | GQIHLDPQQDYQLLQVQR (SEQ ID NO: 16) | 727 | adrenal gland |
| FABP1 | P07148 | AIGLPEELIQK (SEQ ID NO: 17) | 605.9 | liver |
| F2 | P00734 | YGFYTHVFR (SEQ ID NO: 18) | 595.3 | liver |
| F2 | P00734 | ELLESYIDGR (SEQ ID NO: 19) | 597.8 | liver |
| GNB3 | P16520 | LLVSASQDGK (SEQ ID NO: 20) | 509.3 | non-specific |
| LBP | P18428 | LAEGFPLPLLK (SEQ ID NO: 21) | 599.4 | liver |
| LBP | P18428 | VQLYDLGLQIHK (SEQ ID NO: 22) | 476.3 | liver |
| NEGR1 | Q7Z3B1 | VWNFAPTIQEIK (SEQ ID NO: 23) | 729.4 | non-specific |
| PRSS1 | P07477 | LGEHNIEVLEGNEQFINAAK (SEQ ID NO: 24) | 742.4 | pancreas |
| PRSS1 | P07477 | VSTISLPTAPPATGTK (SEQ ID NO: 25) | 770.9 | pancreas |
| PRSS1 | P07477 | VSTISLPTAPPATGTK (SEQ ID NO: 25) | 770.9 | pancreas |
| PRSS3 | P35030 | LSSPAVINAR (SEQ ID NO: 26) | 514.3 | pancreas |
| SERPINA3 | P01011 | ITLLSALVETR (SEQ ID NO: 27) | 608.4 | liver |
| SERPINC1 | P01008 | ELLESYIDGR (SEQ ID NO: 19) | 597.8 | liver |
| SERPINC1 | P01008 | FATTFYQHLADSK (SEQ ID NO: 28) | 510.3 | liver |
| SERPINC1 | P01008 | LPGIVAEGR (SEQ ID NO: 29) | 456.3 | liver |
| SPINK1 | P00995 | QTSILIQK (SEQ ID NO: 30) | 465.8 | pancreas |
| VIP | P01282 | LLGQLSAK (SEQ ID NO: 31) | 415.3 | non-specific |

16S Amplicon Sequencing Data Processing

The samples were processed using a customized open-source pipeline. Here, individual samples were processed in order to yield individual amplicon sequence variants (ASVs). After merging forward and reverse ASVs, chimeras were removed using the de novo algorithm, which removed about 17% of all reads as chimeric. Taxonomic names were assigned using the RDP method and using the Silva 16S reference database (version 132). Eighty-nine percent of the total reads could be mapped to at least the genus level this way. The resulting ASV abundance tables, taxonomy assignments, and sample metadata were finally merged into a single phyloseq object that was used for further analysis.

Metagenomics Data Processing

Trimming and filtering for the raw sequencing data were performed. The first five bases on the 59 end were trimmed from each read to avoid leftover PCR primers, and each read was furthermore trimmed on the 39 by the sliding window method with a minimum quality threshold of 20. Abundances of species were obtained using the default KRAKEN database. Contigs were assembled de novo with a cross-assembly across all samples. Open reading frames (ORFs) in the resulting contigs were then identified. Reads from each sample were then aligned to each contig, and gene abundances for each sample were quantified with an Expectation-Maximization algorithm. The identified ORFs were annotated.

Replication rates were inferred using the iRep approach. Here, the reads for each sample were aligned to the full assembled contigs. Coverage profiles were extracted for all contigs larger than 5,000 bp across bins of a 100-bp width, but only contigs with a minimum length of 11,000 bp and a mean coverage of 2× were used for the iRep inference. Coverage profiles were smoothened using a sliding window mean over 50 bins (5,000-bp window width) before calculating the replication rates. Taxonomic classifications of individual contigs were obtained with the default database of single-copy marker genes.

Statistical Analyses

Raw SRM abundances from the 25-subject cohort were log-transformed, which yielded data that appeared to be normally distributed (as validated by QQ plots). Change in protein abundance across the intervention was then quantified as the difference of protein abundance after intervention and the baseline abundance, yielding log ratios of post-intervention versus baseline abundances. Associations with weight loss were obtained by linear regression of the obtained log ratios using the design shown in FIG. 4. Here, assignment to the "weight loss" group was the target covariate, correcting for baseline BMI, age, and sex. Due to the low sample size in the metagenomics cohort, interaction terms between sex and weight loss groups did not fit as this would have led some coefficients to be estimated from very small cohorts (n<6). False-discovery rates were controlled by adjusting P values using the Benjamini-Hochberg correction.

Figure 4:
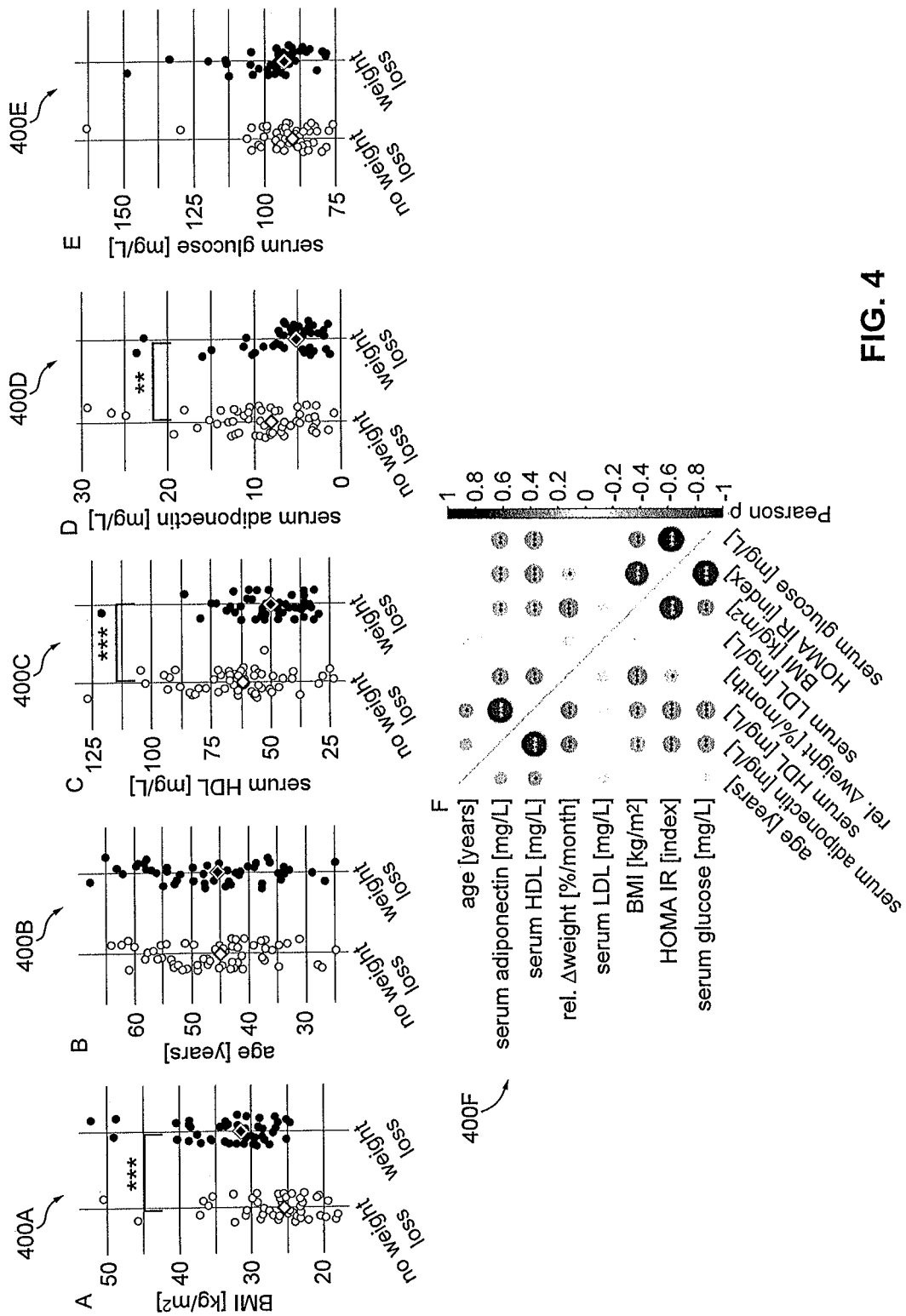
FIG. 4 illustrates exemplary baseline metabolic markers of subjects of a reference population.

Referring to FIG. 4, baseline metabolic markers in the full cohort (n=105) are shown. Dot plots 400A-E show baseline BMI (dot plot 400A), age (dot plot 400B), baseline serum HDL (dot plot 400C), baseline serum adiponectin (dot plot 400D), and baseline serum glucose (dot plot 400E) in the "weight loss" and "no weight loss" groups. In the dot plots 400A-E, asterisks denote significance under a Welch t-test and diamonds denote group medians. Graph 400F shows a correlation matrix showing Pearson's correlation coefficients between baseline BMI, weight loss, and clinical markers of metabolic health across the entire cohort. Asterisks in graph 400F denote significance under a Pearson moment-product correlation test. In FIG. 4 to, *, $P<0.001$; , $P<0.01$; *, $P<0.05$.

For the 105-subject cohort, mass spectrometry data from untargeted metabolomics and proteomics data were log-transformed, as this yielded near-normal distributions on QQ plots. Log-abundance values were then used for linear regressions using the design formula shown in FIG. 5. For each metabolite and protein, a regression without the "weight loss" group and using the baseline BMI as the target covariate was performed to yield the association strength with BMI. Linear regressions were run without Bayesian shrinkage as this is specific to gene expression data. False-discovery rates were controlled by adjusting P values using the Benjamini-Hochberg correction. T-values for each association coefficient were calculated as the ratio of coefficient and estimated coefficient standard deviation obtained from the Fisher matrix of the regression.

Responses to food frequency questions were extracted from the 105-subject cohort and covered a set of 39 food groups on an ordinal scale ranging from 0 (no consumption) up to 8 (very frequent consumption). The numeric frequency values were used in univariate regression models with the food frequency measure as dependent variable and the same independent variables used in the metabolomic and proteomic data analysis (and shown in FIG. 5). For each food group a regression without the "weight loss" group and using the baseline BMI as the target covariate was performed to yield the association strength with BMI. T-values for each association coefficient were again calculated as the ratio of coefficient and estimated coefficient standard deviation obtained from the Fisher matrix of the regression.

Like 16S genus abundances (105 samples), metagenomic species abundances (25 samples) and gene abundances (25 samples) were both obtained from sequencing count data as described above. Each data type was stored as its own phyloseq object. Both data types (taxon and gene abundances) were analyzed using negative binomial regressions, which have been shown to fit metagenomic and amplicon sequencing data well. This again used the design shown in FIG. 4. However, this time the regressions were performed with negative binomial regression and using a prior normalization. For each microbiome feature (e.g., genus, species, or gene) a regression without the "weight loss" group and using the baseline BMI as the target covariate was performed to yield the association strength with BMI. False-discovery rates were controlled by adjusting P values using the Benjamini-Hochberg correction within each data type. Pseudo-T-values were calculated as the ratio of coefficient and estimated coefficient standard error obtained. For gene richness estimates all samples were first down sampled to 100,000 total reads with assigned gene clusters. Gene richness was then calculated as the number of observed unique KO term gene clusters in each sample. Regressions were performed with the formulation shown in FIG. 6 and using the gene richness as the response variable.

Study Design and Cohorts

As described above, existing data and biobanked samples from the subjects were leveraged. Briefly, subjects enrolled in a commercial behavioral coaching program were paired with a registered dietitian or registered nurse coach. Personalized, telephonic behavioral coaching was provided to each subject on a monthly basis, with email or text communications between coaching calls. This service included longitudinal "deep phenotyping," which involved collecting blood and stool for baseline single nucleotide polymorphism (SNP) genotyping or whole-genome sequencing (blood) and longitudinal clinical labs (blood), metabolomics (blood), proteomics (blood), and 16S amplicon sequencing of the gut microbiome (stool), along with lifestyle questionnaires, body weight measurements, and additional activity-tracking data from wearable devices. Subjects undergoing these personalized interventions showed broad improvements across a number of validated health markers, including an average reduction in BMI. A subset of the approximately 5,000 subjects were targeted to look specifically at weight loss phenotypes during this lifestyle intervention period (FIG. 3). Briefly, there were 1,252 subjects with blood collected at two time points over the course of a year, 239 of whom had a paired stool sample at baseline and longitudinal data on BMI (FIG. 3). These 239 subjects were further subdivided by selecting subjects who lost 0.1% of their body weight per month over a 6- to 12-month period (n=48) and those who maintained a stable BMI (n=57) over the same period (FIG. 3). From this 105-subject cohort, another subset of 25 subjects (15 "weight loss" and 10 with "no weight loss") were subselected for additional assays to evaluate whether weight loss responses were associated with (i) concomitant improvements in protein markers of metabolic health and (ii) baseline metagenomic functional gene and taxonomic profiles (FIG. 3). Biobanked fecal samples from this 25-subject cohort were used to generate shallow shotgun metagenomes (>2 million reads per sample), in order to obtain gut microbiome functional and taxonomic profiles. Two biobanked plasma samples (taken before and after intervention) taken from each of these 25 subjects were used to generate additional proteomic data on a broad set of obesity and cardiometabolic health markers (Table 2).

Baseline Metabolic Markers in the Full Cohort

In the full cohort of 105 subjects there were no significant differences in age and glucose levels between the "weight loss" and "no weight loss" groups at baseline, but the "weight loss" group had a significantly higher baseline BMI, lower baseline serum high-density lipoprotein (HDL) levels, and slightly lower baseline serum adiponectin levels (FIG. 4, and Table 3). All subjects in the "weight loss" group were considered either overweight or obese (BMI>25 and 30, respectively), while half of the "no weight loss" group were overweight and the other half were considered normal weight (BMI>25 and <25, respectively). Across the cohort baseline BMI was significantly correlated with several baseline metabolic health markers, such as adiponectin, HDL, insulin resistance, and glucose levels. Those subjects with higher baseline BMIs tended to lose more weight, which is often termed the "regression-to-the-mean" effect in weight loss studies. Because baseline BMI could potentially mask independent measures associated with weight loss via this regression-to-the-mean effect, all weight loss associations were corrected for baseline BMI.

TABLE 3

Change in blood measurements over time in program (from day 0 to 300 days)

| | | |
|---|---|---|
| serum adiponectin [mg/L] | delta = 0.12 | p = 0.69 |
| serum HDL [mg/L] | delta = 1.9 | p = 0.035 |
| serum LDL [mg/L] | delta = 1.6 | p = 0.5 |
| serum glucose [mg/L] | delta = −1.2 | p = 0.23 |
| HOMA IR [index] | delta = −0.41 | p = 0.013 |
| serum insulin [mIU/L] | delta = −1.3 | p = 0.016 |
| serum CRP [mg/L] | delta = −0.018 | p = 0.95 |
| glycated hemoglobin [%] | delta = −0.22 | p = 3e−19 |

Serum Protein Markers Associated with Obesity and Metabolic Health

Figure 5:
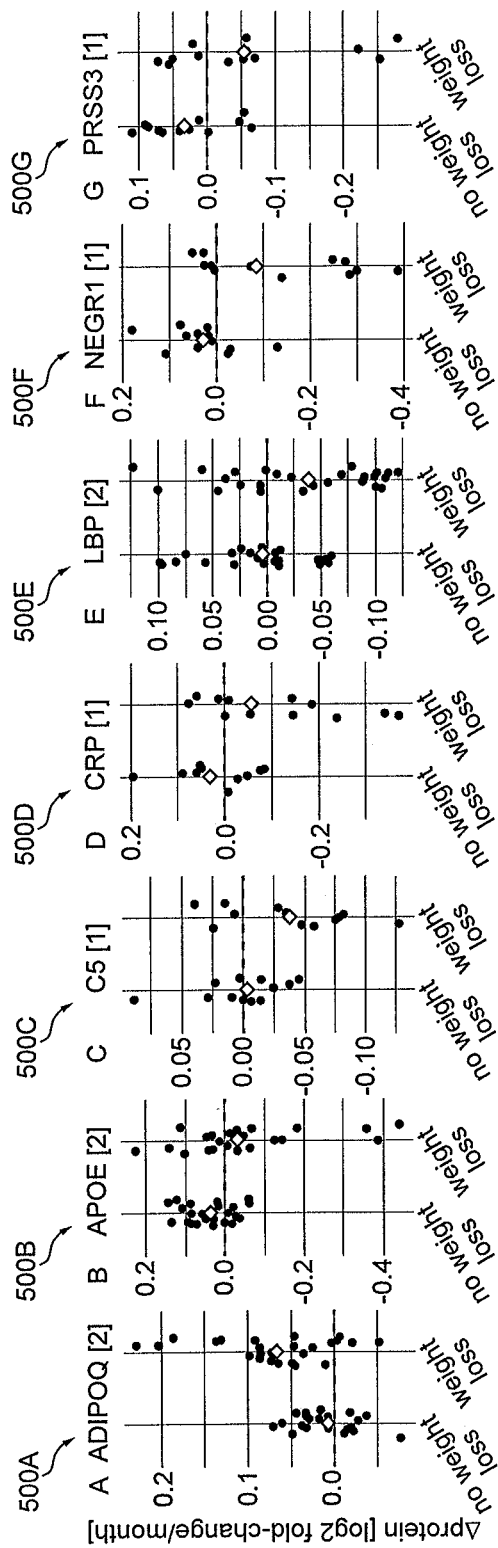
FIG. 5 illustrates exemplary proteomic markers of metabolic health of subjects of a reference population.

To evaluate whether metabolic health improved in the weight loss group independently of baseline BMI, a panel of 22 serum protein markers associated with obesity and metabolic health were used. The 22 serum protein markers were measured before and after intervention in the 25-subject subcohort. On average, only subjects in the "weight loss" group showed broad improvements in seven blood proteomic markers of metabolic health following the intervention (false-discovery rate [FDR]-corrected analysis of variance [ANOVA]P<0.1, FIG. 5). Specifically, the "weight loss" group showed a marked increase in ADIPOQ (adiponectin) levels, which have previously been negatively associated with BMI and positively associated with fasting. The "weight loss" group also showed decreased levels of APOE, C5, CRP, LBP, NEGR1, and PRSS3, which have all been positively associated with obesity, inflammation, and metabolic disorders (FIG. 5). Thus, not only did the "weight loss" group reduce their BMI during the intervention period, but they became metabolically and immunologically healthier as well.

Referring to FIG. 5, additional proteomic markers of metabolic health in the subcohort of 25 subjects are shown. Each plot 500A-G shows blood proteins that changed significantly in abundance (FDR-corrected P<0.1 when corrected for baseline BMI) between baseline and follow-up sampling in the "weight loss" group, independent of baseline BMI. Dashed line denotes no change in protein abundance over time, diamonds denote the means for the two groups, and numbers in brackets denote how many unique peptide fragments were used to quantify each protein.

Associations between Baseline Features and Weight Loss

Figure 6:
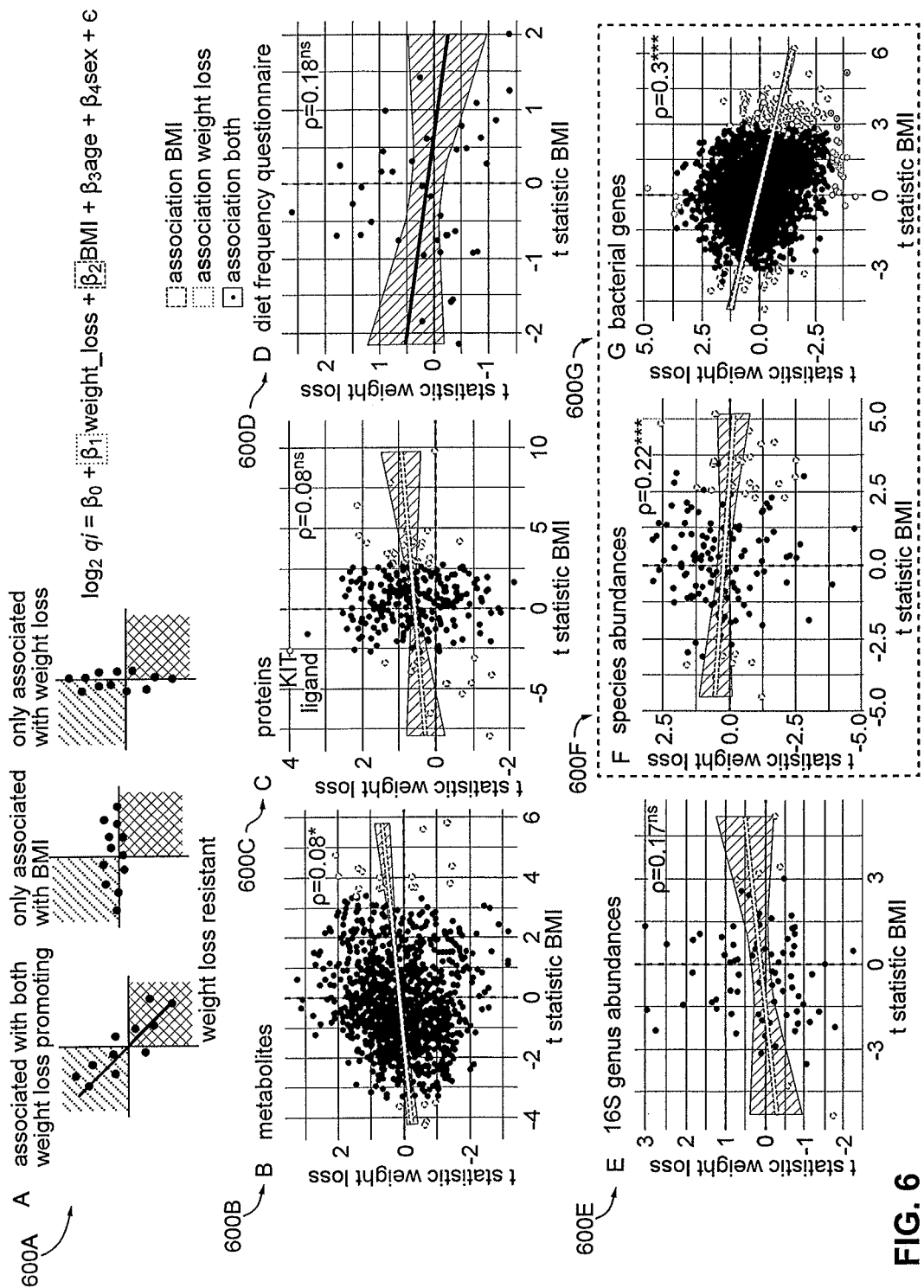
FIG. 6 illustrates exemplary results of associations between baseline multi-omic features, BMI, and weight loss.

Associations between baseline features and weight loss that were independent of baseline BMI, age, and sex were tested (FIG. 6). Although one might expect baseline phenotypic and dietary factors associated with baseline BMI to have similar associations with changes in BMI (FIG. 6), it was found that these associations were largely independent for blood metabolomics, blood proteomics, 16S genus-level abundances, and dietary patterns in the 105-subject cohort (all Pearson's coefficients>0 or non-significant, FIG. 6) and only weakly correlated for metagenome-derived gut microbial species abundances (Pearson rho=20.22, FIG. 6) and functional gene abundances (Pearson rho=20.3, FIG. 6) in the 25-subject subcohort. Thus, phenotypic associations with BMI and weight loss were largely orthogonal (FIG. 6). None of the food frequency measures collected from this cohort were significantly associated with BMI or weight loss (FIG. 6). Sixty baseline blood- and stool-derived features were independently associated with baseline BMI in the 105-subject cohort, including known markers of weight loss and weight gain such as leptin and insulin-like growth factor (FIG. 6). There were no baseline blood metabolites significantly associated with weight change, independent of baseline BMI (FIG. 6). Only a single protein (KIT ligand) out of 268 baseline proteins tested was independently associated with weight loss resistance (FIG. 6). The KIT ligand has been reported previously to be associated with obesity and energy expenditure in mice and humans. While 6 baseline bacterial genera (16S) were associated with baseline BMI in the 105-subject cohort, none were independently associated with weight loss (FIG. 6), and this was consistent with metagenomic species-level results from the 25-subject cohort (FIG. 6). In concordance with a previous study, it was observed that subjects with higher baseline BMI showed slightly lower metagenomic gene richness, where an increase in 1 BMI unit was associated with a loss of approximately 19 genes (P=0.02, ANOVA corrected for baseline sex and age). Baseline gene richness was not predictive of future weight loss success, when adjusting for baseline BMI (ANOVA P=0.93). However, several of the 2,975 gut bacterial gene clusters included in this analysis showed independent associations with either BMI (177, FDR-corrected P<0.05; Table 4) or weight loss (27, FDR-corrected P<0.05; Table 4) in the 25-subject cohort, and a few showed independent associations with both baseline BMI and weight loss (4, FDR-corrected P<0.05, plot 500G in FIG. 5, Table 4). Here, it was found that the baseline stool metagenomic functional genes show a much larger number of associations with weight loss phenotypes than baseline gut taxonomic, blood proteomic, blood metabolomic, or dietary features.

Referring to FIG. 6, associations between baseline multi-omic features, BMI, and weight loss are shown. Diagram 600A shows biplots of t-statistic for features' independent associations with BMI or weight loss, controlling for age and sex. Graph 600B shows the relationship between t-statistic weight loss and t-statistic BMI for baseline blood metabolites, graph 600C shows the relationship between t-statistic weight loss and t-statistic BMI for baseline blood proteins, graph 600D shows the relationship between t-statistic weight loss and t-statistic BMI for baseline dietary features, graph 600E shows the relationship between t-statistic weight loss and t-statistic BMI for baseline 16S bacterial genera, graph 600F shows the relationship between t-statistic weight loss and t-statistic BMI for baseline metagenome-derived gut bacterial species, and graph 600G shows baseline metagenome-derived gut bacterial functional genes. Unfilled circles of long dashes denote features significantly associated with BMI only (i.e., independent of weight loss, age, and sex), unfilled circles of short dashes denote features significantly associated with weight loss only (independent of BMI, age, and sex), and circles with dots in the center denote features independently associated with both BMI and weight loss (independent of age and sex). In graphs 600B-G, asterisks denote significance under a Pearson correlation test and p denotes the Pearson correlation coefficient between the t statistics for BMI and weight loss (*, P<0.001; , P<0.01; *, P<0.05; ns, P<0.05). The dashed box around graphs 600F-G denotes metagenomic results from the subcohort of 25 subjects, while the results in graphs 600B-E are from the larger cohort of 105 subjects.

TABLE 4

Functional features associated with weight loss response

| Feature | ko_term | CAZy | base mean | log2 fold change | lfc standard error |
| --- | --- | --- | --- | --- | --- |
| amino acid metabolism | ko: K01658 | | 135.2786771 | −1.01064887 | 0.2358099 |
| cell wall synthesis | ko: K11528 | | 111.4582422 | 1.648150202 | 0.341261775 |
| carbohydrate metabolism | ko: K00689 | GH13 | 62.18918717 | −1.719492835 | 0.441547648 |
| nitrogen metabolism | ko: K00459 | | 113.6633268 | −1.127205196 | 0.296016504 |
| transporters | ko: K01541 | | 352.8277685 | −0.879759679 | 0.240155678 |
| carbohydrate metabolism | ko: K03436 | | 157.1418953 | −1.163055099 | 0.319993328 |
| stress response | ko: K06959 | | 525.4394968 | −0.738674256 | 0.190186691 |
| transporters | ko: K12950 | | 352.8277685 | −0.879759679 | 0.240155678 |
| amino acid metabolism | ko: K13821 | | 79.58885239 | −1.843663536 | 0.496593438 |
| amino acid metabolism | ko: K00294 | | 49.34915063 | −2.441191228 | 0.761735805 |
| respiration | ko: K00342 | | 224.8689008 | −1.149999539 | 0.340140458 |
| phospholipid metabolism | ko: K01048 | | 88.13364869 | −1.331710783 | 0.409479141 |
| amino acid metabolism | ko: K01262 | | 512.5249687 | −0.603996427 | 0.167399099 |
| carbohydrate metabolism | ko: K01895 | | 339.2326588 | −1.155439715 | 0.328259458 |
| transporters | ko: K02027 | | 1200.759286 | −0.456711031 | 0.123644477 |
| transporters | ko: K03442 | | 226.4927678 | −1.115129263 | 0.319760457 |
| amino acid metabolism | ko: K03544 | | 296.327952 | 0.776190254 | 0.209026814 |
| stress response | ko: K03649 | | 113.2000043 | −1.124164252 | 0.331046481 |
| respiration | ko: K05575 | | 212.8146222 | −1.193134874 | 0.357013478 |
| amino acid metabolism | ko: K06894 | GH20 | 155.5462491 | 1.029259986 | 0.281570899 |
| amino acid metabolism | ko: K12240 | GT2, GT4 | 110.298941 | −1.321818882 | 0.387434032 |
| amino acid metabolism | ko: K01664 | | 116.9567948 | −0.979851862 | 0.280793268 |
| lipopolysaccharide synthesis | ko: K03606 | | 141.5404623 | 0.854696836 | 0.242855356 |
| respiration | ko: K06996 | | 64.84443702 | −1.331769358 | 0.395353667 |
| amino acid metabolism | ko: K13010 | | 250.3548957 | −0.934068403 | 0.28891913 |
| carbohydrate metabolism | ko: K22224 | | 86.72213856 | −1.006408063 | 0.290530158 |
| carbohydrate metabolism | ko: K01905 | | 88.76637556 | −0.980889753 | 0.287356065 |
| carbohydrate metabolism | ko: K01918 | | 135.8954949 | −1.344577419 | 0.402172984 |

TABLE 4-continued

Functional features associated with weight loss response

| Feature | ko_term | CAZy | base mean | log2 fold change | lfc standard error |
|---|---|---|---|---|---|
| stress response | ko: K03723 | GT51 | 682.5118765 | −0.509507371 | 0.148204653 |
| transporters | ko: K04786 | GT2, GT4 | 109.2718134 | −1.677791648 | 0.487566762 |
| respiration | ko: K00176 | | 212.9025615 | −0.996553569 | 0.315682163 |

Metagenomic Markers of Weight Loss

Figure 7:
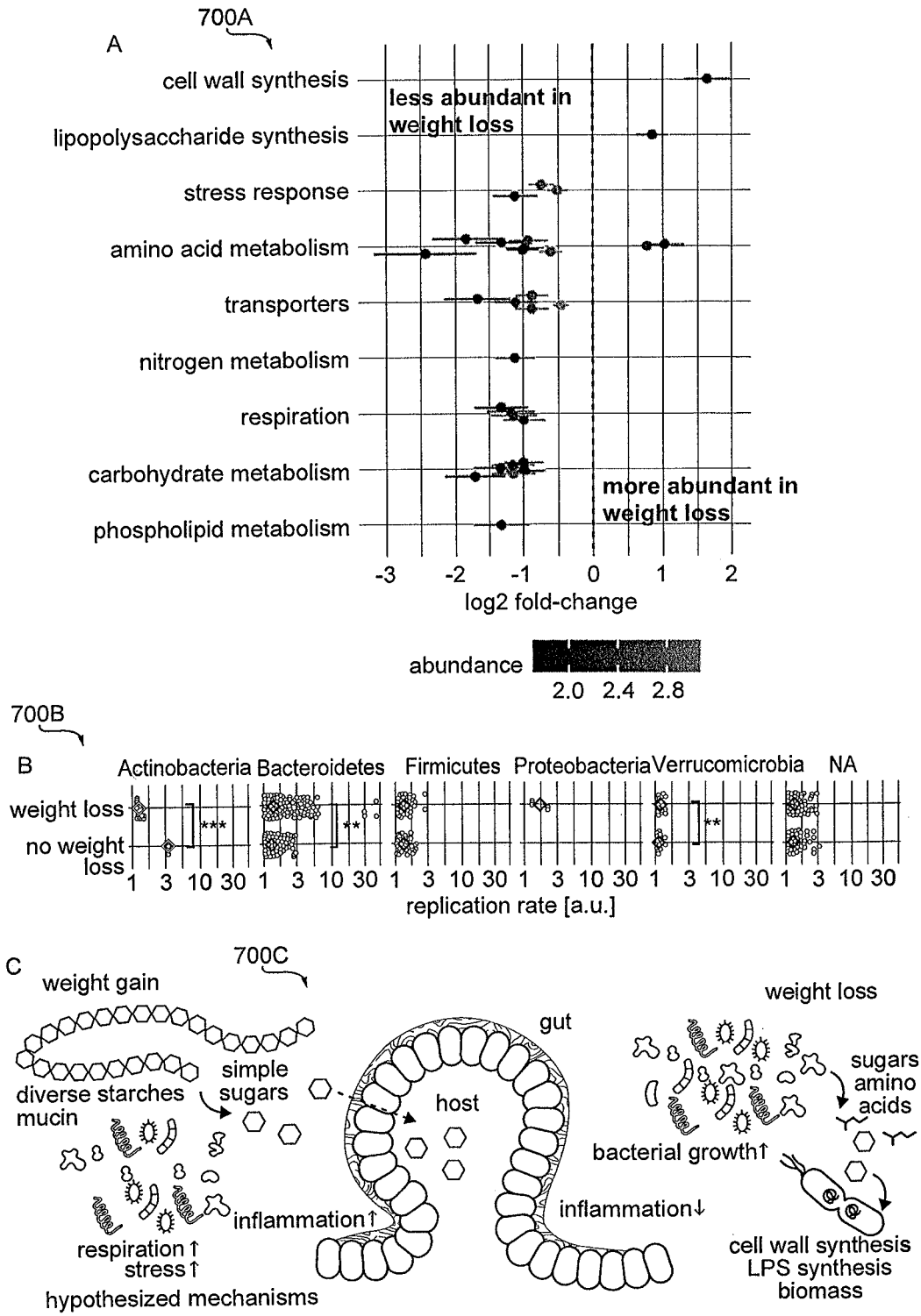
FIG. 7 illustrates exemplary results of metagenomic markers of weight loss in subjects of a reference population.

In total, 31 baseline gut microbiome functional genes were associated with weight loss, independent of baseline BMI (FIG. 7). Cell wall and lipopolysaccharide (LPS) synthesis were positively associated with weight loss, which suggested that cell division, biomass production, and Gram-negative bacterial growth potential might be important. To explore this further, baseline bacterial replication rates were calculated directly from metagenome-assembled contigs and it was found that average replication rates were significantly higher in the "weight loss" group (ANOVA P=0.001, corrected for age and baseline BMI), with Gram-negative Bacteroidetes contigs contributing most to this effect (ANOVA P=0.002, FIG. 7). Most contigs could not be annotated beyond the phylum level, but the fastest-replicating contigs (replication rates>3) with genus-level annotations belonged to *Prevotella* and were observed only in the weight loss group. Most functional genes were associated with resistance to weight loss—specifically, functions involved in glycan (e.g., glycosyl hydrolases) and protein catabolism, response to stress, peptide antibiotic synthesis, and respiration (FIG. 7).

Referring to FIG. 7, metagenomic markers of weight loss in a subcohort of 25 subjects are shown. Graph 700A shows metagenomic gene cluster abundances significantly associated with weight loss (independent of baseline BMI, age, and sex), binned into high-level functional categories. Graph 700B shows the average phylum-specific bacterial replication rates estimated from metagenomes show significant differences across weight loss groups. In graph 700B, "NA" denotes contigs without a phylum-level classification (e.g., not enough single-copy phylogenetic marker genes within those contigs to obtain a phylum-level classification) and asterisks denote significance under ANOVAs while correcting for age and baseline BMI (*, P<0.001; , P<0.01). Diagram 700C is a schematic of proposed microbiome-mediated mechanisms involved in weight loss promotion or resistance based on specific metagenomic functions from graph 700A that were positively or negatively associated with weight loss.

Average changes in replication rates (log-scale) for significantly affected bacterial phyla are illustrated in Table 5. As shown in Table 5, log fold-change denotes coefficients in an ordinary least squares regression corrected for age and BMI. "All phyla" denotes replication rates from all detected taxa. All shown groups were significant under a Wald test with p<0.05.

TABLE 5

Average changes in replication rates (log-scale) for significantly affected bacterial phyla

| Phylum | log fold-change | standard error |
|---|---|---|
| Bacteroidetes | 0.07 | 0.022 |
| Verrucomicrobia | −0.25 | 0.076 |
| Actinobacteria | −1.01 | 0.068 |
| all phyla | 0.05 | 0.016 |

DISCUSSION

Based on the preliminary results from this cohort, a set of hypotheses are proposed for how human gut commensals modulate the host's absorption of calories from the diet and potentially impact intestinal inflammation (FIG. 7). Specifically, the gut microbiota were shown to help break down complex, extracellular polysaccharides into simpler sugars that are more readily absorbed by the host. Indeed, it was seen that certain CAZy enzyme classes (e.g., GH13, which includes the starch-degrading amylases; see FIG. 8) were enriched in subjects who were resistant to weight loss, independent of baseline BMI. A similar metagenomic increase in bacterial amylase gene frequency has been associated with increased weight gain in mice. Furthermore, gut bacterial replication rates were reduced in those who were resistant to weight loss, independent of baseline BMI. Similarly, prior cross-sectional work identified associations between the gut bacterial replication rates from a few taxa and BMI. It is hypothesized that lower commensal growth rates may allow the host epithelium to absorb a larger fraction of extracellular polysaccharide breakdown products in the lumen before they can be transformed into less-energy-dense fermentation by-products, like short-chain fatty acids (SCFAs), and bacterial biomass. SCFA production itself can reduce intestinal inflammation, which in turn may help to improve metabolic health and better facilitate weight loss. Concordantly, reduced levels of circulating inflammation-related proteins were seen in subjects who lost weight (FIG. 5). Finally, reduced inflammation could itself promote fermentative metabolism and redox homeostasis in the gut, minimizing oxic stress to strict anaerobes and suppressing respiratory pathways that favor facultative anaerobes (FIG. 5).

Figure 8:
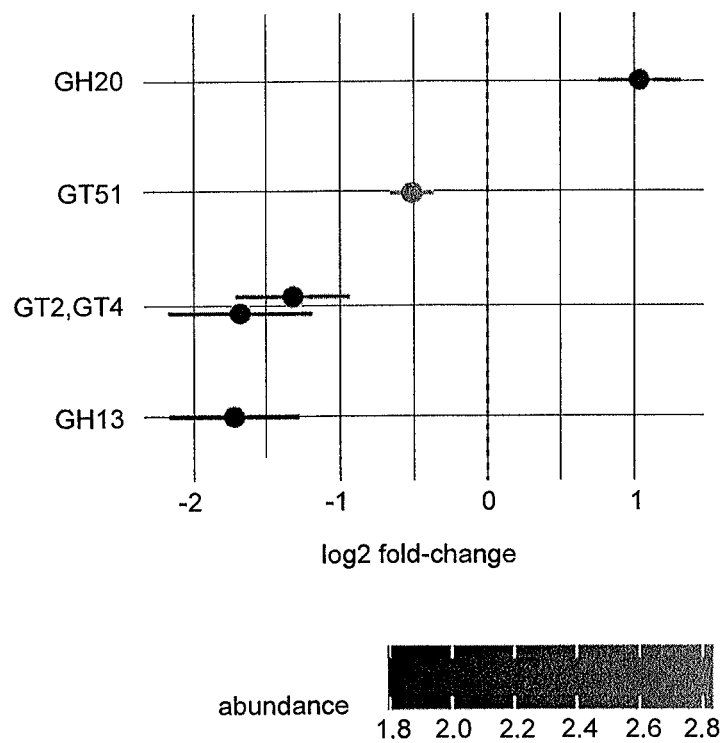
FIG. 8 illustrates exemplary results of a change in abundance of enzyme classes in subjects in a reference population.

FIG. 8 shows a log 2 fold change in abundance of certain CAZy enzyme classes (e.g., GH13, which includes the starch-degrading amylases) in subjects of a reference population resistant to weight loss, independent of baseline BMI.

The results suggest that dietary energy harvest, host-microbe substrate competition, and modulation of host inflammation by commensal bacteria may be, in part, responsible for determining host responses to weight loss interventions, independent of baseline BMI or metabolic health state. Gut ecosystems optimized for fermentative metabolism and higher bacterial growth rates appear to be conducive to weight loss. Prior work has shown that the higher baseline levels of *Prevotella* can improve weight loss responses to a standardized high-fiber diet, and here it was found that higher baseline Bacteroidetes growth rates, driven in part by the genus *Prevotella*, in subjects who lost weight in a commercial wellness program, which often involved suggested increases in dietary fiber and exercise. Recent studies have suggested that one can predict weight loss outcomes following an intervention from baseline 16S rRNA gene community profiles. However, these weight loss studies did not correct for baseline BMI, which can act as a significant confounder (e.g., FIG. 4) due to the regression-to-the-mean effect described above. The putative microbiome-centric weight loss mechanisms identified in this study are largely consistent with prior work in nonhuman animal models and in human observational studies, indicating that energy harvest, abundances of glycosyl hydrolase genes, and inflammation are relevant to weight gain and obesity.

In summary, the results represent a set of gut microbiome functional features that are associated with future changes in weight following an intervention, independent of baseline BMI (FIG. 7).

ADDITIONAL CONSIDERATIONS

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

---

SEQUENCE LISTING

```
Sequence total quantity: 31
SEQ ID NO: 1            moltype = AA  length = 13
FEATURE                 Location/Qualifiers
source                  1..13
                        mol_type = protein
                        organism = Homo sapiens
SEQUENCE: 1
AGTQIENIEE DFR                                                          13

SEQ ID NO: 2            moltype = AA  length = 15
FEATURE                 Location/Qualifiers
source                  1..15
                        mol_type = protein
                        organism = Homo sapiens
SEQUENCE: 2
GDIGETGVPG AEGPR                                                        15

SEQ ID NO: 3            moltype = AA  length = 15
FEATURE                 Location/Qualifiers
source                  1..15
                        mol_type = protein
                        organism = Homo sapiens
SEQUENCE: 3
IFYNQQNHYD GSTGK                                                        15

SEQ ID NO: 4            moltype = AA  length = 12
FEATURE                 Location/Qualifiers
source                  1..12
                        mol_type = protein
                        organism = Homo sapiens
SEQUENCE: 4
DPTFIPAPIQ AK                                                           12
```

-continued

```
SEQ ID NO: 5              moltype = AA  length = 10
FEATURE                   Location/Qualifiers
source                    1..10
                          mol_type = protein
                          organism = Homo sapiens
SEQUENCE: 5
LQAILGVPWK                                                              10

SEQ ID NO: 6              moltype = AA  length = 14
FEATURE                   Location/Qualifiers
source                    1..14
                          mol_type = protein
                          organism = Homo sapiens
SEQUENCE: 6
SELTQQLNAL FQDK                                                         14

SEQ ID NO: 7              moltype = AA  length = 17
FEATURE                   Location/Qualifiers
source                    1..17
                          mol_type = protein
                          organism = Homo sapiens
SEQUENCE: 7
SLAELGGHLD QQVEEFR                                                      17

SEQ ID NO: 8              moltype = AA  length = 9
FEATURE                   Location/Qualifiers
source                    1..9
                          mol_type = protein
                          organism = Homo sapiens
SEQUENCE: 8
SVGFHLPSR                                                                9

SEQ ID NO: 9              moltype = AA  length = 15
FEATURE                   Location/Qualifiers
source                    1..15
                          mol_type = protein
                          organism = Homo sapiens
SEQUENCE: 9
AATVGSLAGQ PLQER                                                        15

SEQ ID NO: 10             moltype = AA  length = 9
FEATURE                   Location/Qualifiers
source                    1..9
                          mol_type = protein
                          organism = Homo sapiens
SEQUENCE: 10
LGPLVEQGR                                                                9

SEQ ID NO: 11             moltype = AA  length = 10
FEATURE                   Location/Qualifiers
source                    1..10
                          mol_type = protein
                          organism = Homo sapiens
SEQUENCE: 11
HTLNQIDEVK                                                              10

SEQ ID NO: 12             moltype = AA  length = 12
FEATURE                   Location/Qualifiers
source                    1..12
                          mol_type = protein
                          organism = Homo sapiens
SEQUENCE: 12
LQTNGALPDD LK                                                           12

SEQ ID NO: 13             moltype = AA  length = 10
FEATURE                   Location/Qualifiers
source                    1..10
                          mol_type = protein
                          organism = Homo sapiens
SEQUENCE: 13
GYSIFSYATK                                                              10

SEQ ID NO: 14             moltype = AA  length = 12
FEATURE                   Location/Qualifiers
source                    1..12
                          mol_type = protein
                          organism = Homo sapiens
SEQUENCE: 14
```

IDTQDIEASH YR                                                                                           12

SEQ ID NO: 15           moltype = AA   length = 19
FEATURE                 Location/Qualifiers
source                  1..19
                        mol_type = protein
                        organism = Homo sapiens
SEQUENCE: 15
AFYYPEEAGL AFGGPGSSR                                                                                    19

SEQ ID NO: 16           moltype = AA   length = 18
FEATURE                 Location/Qualifiers
source                  1..18
                        mol_type = protein
                        organism = Homo sapiens
SEQUENCE: 16
GQIHLDPQQD YQLLQVQR                                                                                     18

SEQ ID NO: 17           moltype = AA   length = 11
FEATURE                 Location/Qualifiers
source                  1..11
                        mol_type = protein
                        organism = Homo sapiens
SEQUENCE: 17
AIGLPEELIQ K                                                                                            11

SEQ ID NO: 18           moltype = AA   length = 9
FEATURE                 Location/Qualifiers
source                  1..9
                        mol_type = protein
                        organism = Homo sapiens
SEQUENCE: 18
YGFYTHVFR                                                                                                9

SEQ ID NO: 19           moltype = AA   length = 10
FEATURE                 Location/Qualifiers
source                  1..10
                        mol_type = protein
                        organism = Homo sapiens
SEQUENCE: 19
ELLESYIDGR                                                                                              10

SEQ ID NO: 20           moltype = AA   length = 10
FEATURE                 Location/Qualifiers
source                  1..10
                        mol_type = protein
                        organism = Homo sapiens
SEQUENCE: 20
LLVSASQDGK                                                                                              10

SEQ ID NO: 21           moltype = AA   length = 11
FEATURE                 Location/Qualifiers
source                  1..11
                        mol_type = protein
                        organism = Homo sapiens
SEQUENCE: 21
LAEGFPLPLL K                                                                                            11

SEQ ID NO: 22           moltype = AA   length = 12
FEATURE                 Location/Qualifiers
source                  1..12
                        mol_type = protein
                        organism = Homo sapiens
SEQUENCE: 22
VQLYDLGLQI HK                                                                                           12

SEQ ID NO: 23           moltype = AA   length = 12
FEATURE                 Location/Qualifiers
source                  1..12
                        mol_type = protein
                        organism = Homo sapiens
SEQUENCE: 23
VWNFAPTIQE IK                                                                                           12

SEQ ID NO: 24           moltype = AA   length = 20
FEATURE                 Location/Qualifiers
source                  1..20
                        mol_type = protein
                        organism = Homo sapiens

```
SEQUENCE: 24
LGEHNIEVLE GNEQFINAAK                                                                    20

SEQ ID NO: 25           moltype = AA  length = 16
FEATURE                 Location/Qualifiers
source                  1..16
                        mol_type = protein
                        organism = Homo sapiens
SEQUENCE: 25
VSTISLPTAP PATGTK                                                                        16

SEQ ID NO: 26           moltype = AA  length = 10
FEATURE                 Location/Qualifiers
source                  1..10
                        mol_type = protein
                        organism = Homo sapiens
SEQUENCE: 26
LSSPAVINAR                                                                               10

SEQ ID NO: 27           moltype = AA  length = 11
FEATURE                 Location/Qualifiers
source                  1..11
                        mol_type = protein
                        organism = Homo sapiens
SEQUENCE: 27
ITLLSALVET R                                                                             11

SEQ ID NO: 28           moltype = AA  length = 13
FEATURE                 Location/Qualifiers
source                  1..13
                        mol_type = protein
                        organism = Homo sapiens
SEQUENCE: 28
FATTFYQHLA DSK                                                                           13

SEQ ID NO: 29           moltype = AA  length = 9
FEATURE                 Location/Qualifiers
source                  1..9
                        mol_type = protein
                        organism = Homo sapiens
SEQUENCE: 29
LPGIVAEGR                                                                                 9

SEQ ID NO: 30           moltype = AA  length = 8
FEATURE                 Location/Qualifiers
source                  1..8
                        mol_type = protein
                        organism = Homo sapiens
SEQUENCE: 30
QTSILIQK                                                                                  8

SEQ ID NO: 31           moltype = AA  length = 8
FEATURE                 Location/Qualifiers
source                  1..8
                        mol_type = protein
                        organism = Homo sapiens
SEQUENCE: 31
LLGQLSAK                                                                                  8
```

What is claimed:

1. A computer-implemented method, comprising:
accessing gut microbiome metagenomic sequence data corresponding to a plurality of microbial taxa present in the gut of a subject;
determining a measurement of one or more weight loss features in the gut microbiome metagenomic sequence data corresponding to the plurality of microbial taxa, wherein:
the one or more weight loss features define a gut microbiome signature for weight loss response for the subject independent of a body mass index of the subject, and
the one or more weight loss features comprise replication rates of the plurality of microbial taxa;
determining a weight loss potential for the subject based on a comparison of the measurement of the subject to a plurality of reference measurements of the one or more weight loss features for a reference population showing variable weight loss responses;
determining that the weight loss potential for the subject is above a predetermined weight-loss potential threshold; and
administering, based on the determination, a treatment for the subject, wherein the treatment includes a probiotic supplement, or a prebiotic fiber supplement.

2. The computer-implemented method of claim 1, wherein:
the reference population comprises a first group associated with weight loss and a second group unassociated with weight loss,
the first group corresponds to a first subset of subjects of the reference population having a loss of body weight over a weight loss intervention period, and the second group corresponds to a second subset of subjects of the reference population that maintain a stable weight over the weight loss intervention period.

3. The computer-implemented method of claim 1, further comprising performing the comparison by:
   mapping the subject to a first group of the reference population associated with weight loss during a weight loss intervention period or to a second group of the reference population unassociated with weight loss during the weight loss intervention period.

4. The computer-implemented method of claim 1, wherein the one or more weight loss features comprise a gut bacterial gene abundance for a gut metabolism of the subject, a gut inflammation of the subject, or a combination thereof.

5. The computer-implemented method of claim 1, wherein:
   the one or more weight loss features comprise:
   (i) a plurality of gut bacterial replication rates for strictly anaerobic gram-negative gut bacteria of the subject, and
   (ii) a gut bacterial gene abundance for a gut metabolism of the subject, a gut inflammation of the subject, or a combination thereof; and
   the gut metabolism corresponds to an abundance of gut glycosyl hydrolase genes for the subject and the gut inflammation corresponds to an abundance of respiration-related genes and an abundance of stress-response genes for the subject.

6. The computer-implemented method of claim 1, wherein:
   (i) the weight loss potential being above a first predetermined threshold is associated with an abundance of gut glycosyl hydrolase genes for the subject being below a second threshold, an abundance of respiration-related genes and an abundance of stress-response genes for the subject being below a third threshold, and the replication rates of strictly anaerobic gram-negative gut bacteria of the subject being above a fourth threshold, and
   (ii) the weight loss potential being below the first predetermined threshold is associated with the abundance of the gut glycosyl hydrolase genes for the subject being above the second threshold, the abundance of the respiration-related genes and the abundance of the stress-response genes for the subject being above the third threshold, and the replication rates of strictly anaerobic gram-negative gut bacteria for the subject being below the fourth threshold.

7. The computer-implemented method of claim 1, wherein the weight loss potential characterizes whether or a degree to which the subject is predicted to lose weight with a lifestyle modification comprising one or more of diabetes prevention, exercise, or dietary intervention.

8. The computer-implemented method of claim 1, further comprising:
   facilitating a lifestyle modification for the subject.

9. The computer-implemented method of claim 1, further comprising:
   determining a lifestyle modification for the subject is associated with the weight loss potential for the subject being below a threshold; and
   administering, based on the determination that the weight loss potential for the subject is above the predetermined weight-loss potential threshold, a pharmacologic intervention.

10. A system comprising:
    one or more data processors; and
    a non-transitory computer readable storage medium containing instructions which, when executed on the one or more data processors, cause the one or more data processors to perform a set of actions including:
    accessing gut microbiome metagenomic sequence data corresponding to a plurality of microbial taxa for a subject;
    determining a measurement of one or more weight loss features in the gut microbiome metagenomic sequence data corresponding to a plurality of microbial taxa, wherein:
    the one or more weight loss features define a gut microbiome signature for weight loss response for the subject independent of a body mass index of the subject, and
    the one or more weight loss features comprise replication rates of the plurality of microbial taxa;
    determining a weight loss potential for the subject based on a comparison of the measurement of the subject to a plurality of reference measurements of the one or more weight loss features for a reference population showing variable weight loss responses;
    determining that the weight loss potential for the subject is above a predetermined weight-loss potential threshold; and
    initiating administering, based on the determination, a treatment for the subject, wherein the treatment includes a probiotic supplement, or a prebiotic fiber supplement.

11. The system of claim 10, wherein:
    the reference population comprises a first group associated with weight loss and a second group unassociated with weight loss,
    the first group corresponds to a first subset of subjects of the reference population having a loss of body weight over a weight loss intervention period, and
    the second group corresponds to a second subset of subjects of the reference population that maintain a stable weight over the weight loss intervention period.

12. The system of claim 10, wherein the set of actions further include performing the comparison comprises:
    mapping the subject to a first group of the reference population associated with weight loss during a weight loss intervention period or to a second group of the reference population unassociated with weight loss during the weight loss intervention period.

13. The system of claim 10, wherein the one or more weight loss features comprise a gut bacterial gene abundance for a gut metabolism of the subject, a gut inflammation of the subject, or a combination thereof.

14. The system of claim 10, wherein:
    the one or more weight loss features comprise:
    (i) a plurality of gut bacterial replication rates for strictly anaerobic gram-negative gut bacteria of the subject, and
    (ii) a gut bacterial gene abundance for a gut metabolism of the subject, a gut inflammation of the subject, or a combination thereof; and
    the gut metabolism corresponds to an abundance of gut glycosyl hydrolase genes for the subject and the gut inflammation corresponds to an abundance of respiration-related genes and an abundance of stress-response genes for the subject.

15. The system of claim 10, wherein the weight loss potential characterizes whether or a degree to which the subject is predicted to lose weight with a lifestyle modification comprising one or more of a diabetes prevention, a change to an exercise routine, or a dietary intervention.

16. The system of claim 10, wherein the set of actions further include:
facilitating a lifestyle modification for the subject.

17. The system of claim 10, wherein the set of actions further include:
determining a lifestyle modification for the subject is associated with the weight loss potential for the subject being below a threshold; and
administering, based on the determination that the weight loss potential for the subject is above the predetermined weight-loss potential threshold, a pharmacologic intervention.

18. A computer-program product tangibly embodied in a non-transitory machine-readable storage medium, including instructions configured to cause one or more data processors to perform a set of actions including:
accessing gut microbiome metagenomic sequence data corresponding to a plurality of microbial taxa present in the gut of a subject;
determining a measurement of one or more weight loss features in the gut microbiome metagenomic sequence data corresponding to a plurality of microbial taxa, wherein:
the one or more weight loss features define a gut microbiome signature for weight loss response for the subject independent of a body mass index of the subject, and
the one or more weight loss features comprise replication rates of the plurality of microbial taxa;
determining a weight loss potential for the subject based on a comparison of the measurement of the subject to a plurality of reference measurements of the one or more weight loss features for a reference population associated with variable weight loss responses;
determining that the weight loss potential for the subject is above a predetermined weight-loss potential threshold; and
initiating administering, based on the determination, a treatment for the subject, wherein the treatment includes a probiotic supplement, or a prebiotic fiber supplement.

19. The computer-implemented method of claim 1, further comprising:
administering, based on the determination, an alpha-glucosidase inhibitor.

20. The computer-implemented method of claim 1, further comprising:
administering, based on the determination, metformin as a preventative measure for diabetes.

* * * * *